United States Patent
Kudo et al.

(10) Patent No.: US 6,734,901 B1
(45) Date of Patent: May 11, 2004

(54) VIBRATION CORRECTION APPARATUS

(75) Inventors: Toshimichi Kudo, Fujisawa (JP);
Hideo Kawahara, Hatogaya (JP);
Junichi Murakami, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/082,301

(22) Filed: May 20, 1998

(30) Foreign Application Priority Data

| May 20, 1997 | (JP) | 9-129695 |
| Dec. 1, 1997 | (JP) | 9-330136 |
| Dec. 17, 1997 | (JP) | 9-347823 |
| Dec. 19, 1997 | (JP) | 9-350969 |

(51) Int. Cl.⁷ .............................. H04N 5/228
(52) U.S. Cl. .............. 348/208.4; 348/208.1; 348/208.2; 348/208.8; 348/208.16
(58) Field of Search .............. 348/208.99, 352, 348/208.1, 208.2, 208.6, 208.5, 207.99, 208.8, 208.16; 396/52, 53, 54, 55

(56) References Cited

U.S. PATENT DOCUMENTS

| 5,587,737 A | * | 12/1996 | Sekine et al. ............. 348/208.8 |
| 5,805,212 A | * | 9/1998 | Fujiwara ...................... 396/52 |
| 5,867,213 A | * | 2/1999 | Ouchi ......................... 348/208 |
| 5,946,030 A | * | 8/1999 | Cooper ........................ 348/208 |
| 6,034,723 A | * | 3/2000 | Fujimori ...................... 348/208 |
| 6,112,027 A | * | 8/2000 | Sekine et al. ................. 396/52 |
| 6,320,613 B1 | * | 11/2001 | Shiomi ..................... 348/208.1 |
| 6,573,930 B2 | * | 6/2003 | Kyuma et al. ........... 348/208.5 |
| 2003/0035053 A1 | * | 2/2003 | Kyuma et al. ........... 348/208.2 |

FOREIGN PATENT DOCUMENTS

JP 8-304672 11/1996 ............ G02B/6/42

* cited by examiner

Primary Examiner—Wendy R. Garber
Assistant Examiner—Jason Whipkey
(74) Attorney, Agent, or Firm—Fitzpatrick, Cella, Harper & Scinto

(57) ABSTRACT

A vibration correction apparatus has a motion vector detection circuit for detecting a motion vector signal at a predetermined sampling period, a signal processing circuit for calculating a correction target value in accordance with the motion vector signal detected by the motion vector detection circuit, a correction system for correcting a motion in accordance with the correction target value, and a control circuit for generating a new correction target value through interpolation of the correction target value, shortening a correction period of correction by the correction system shorter than a sampling period of the motion vector, and making the period of correction by the correction system variable with each image pickup system.

16 Claims, 26 Drawing Sheets

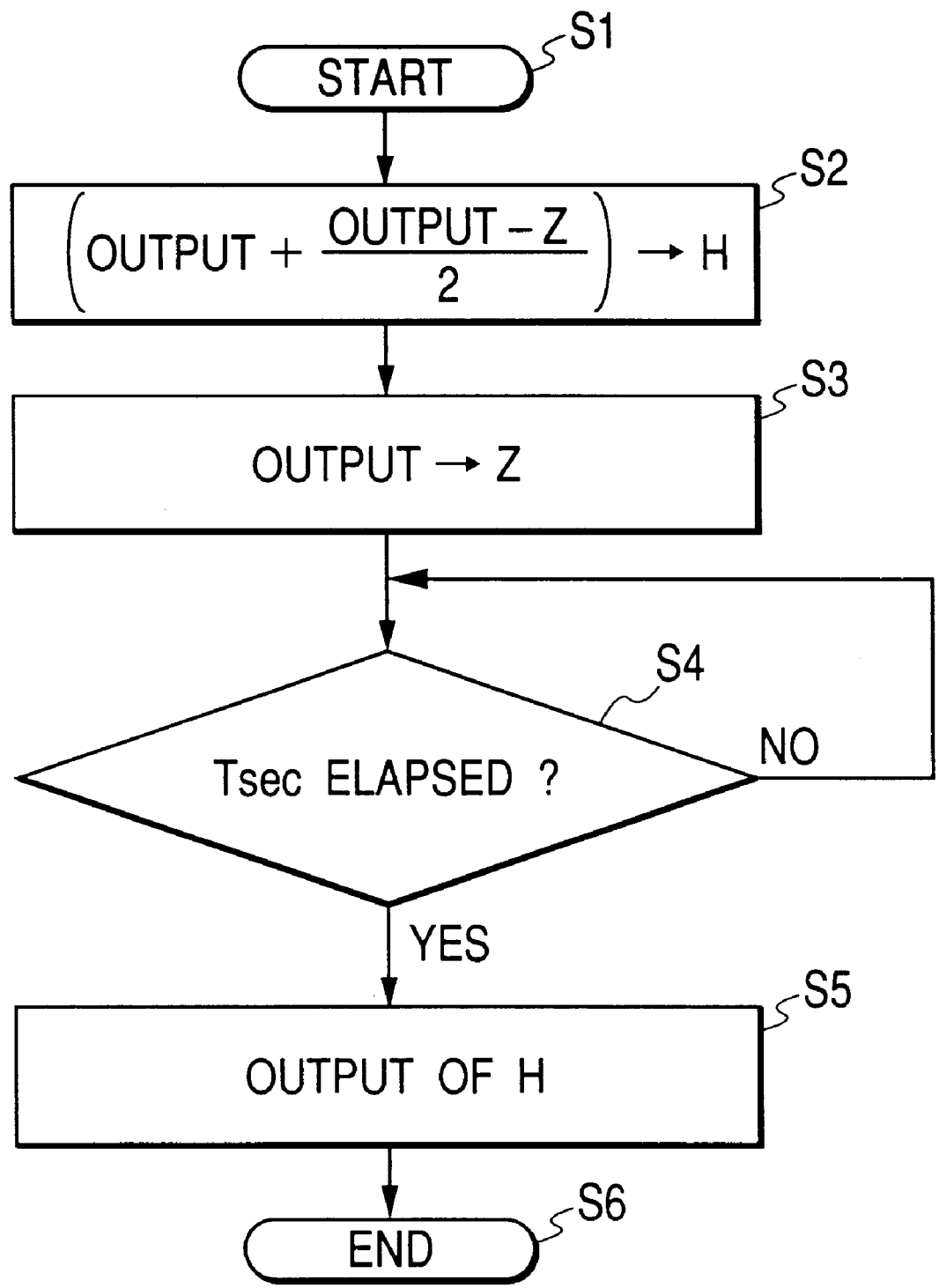

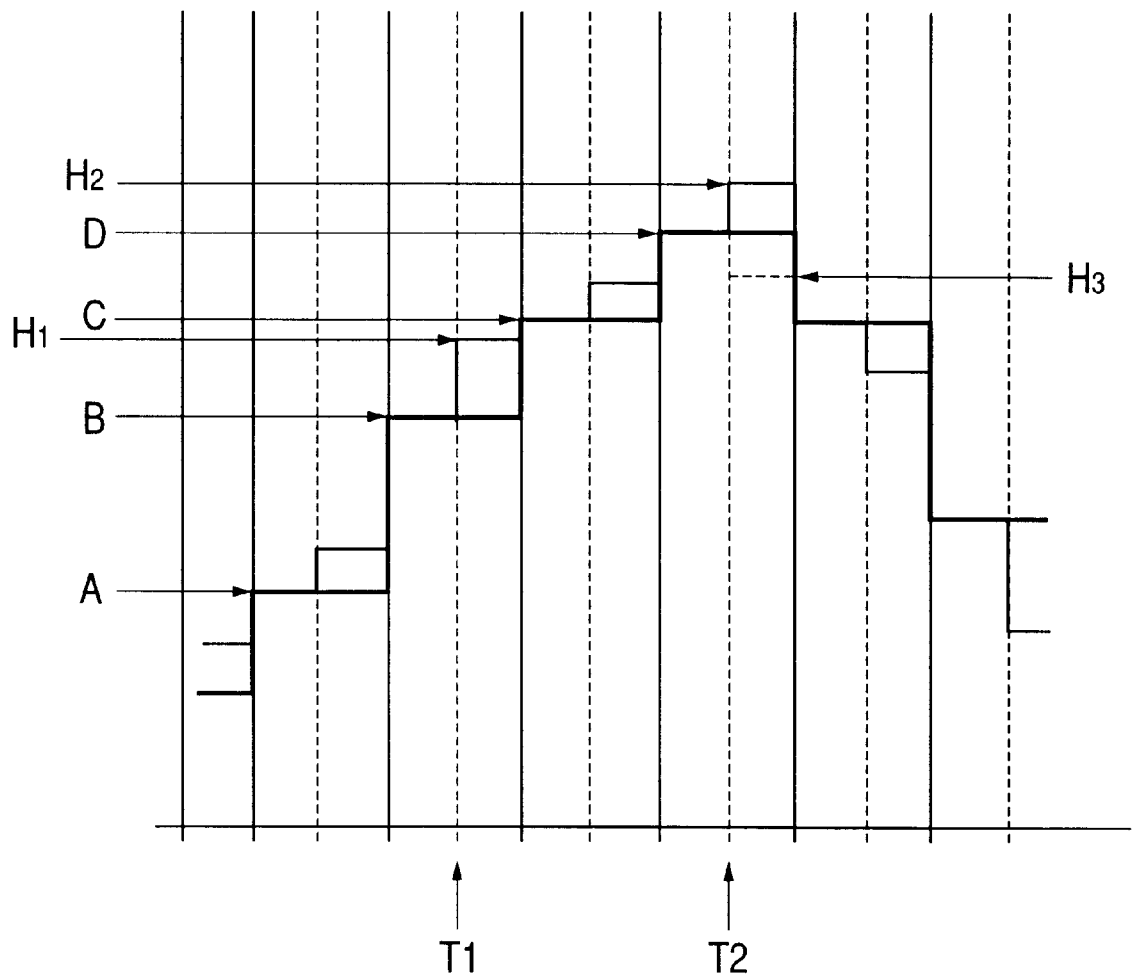

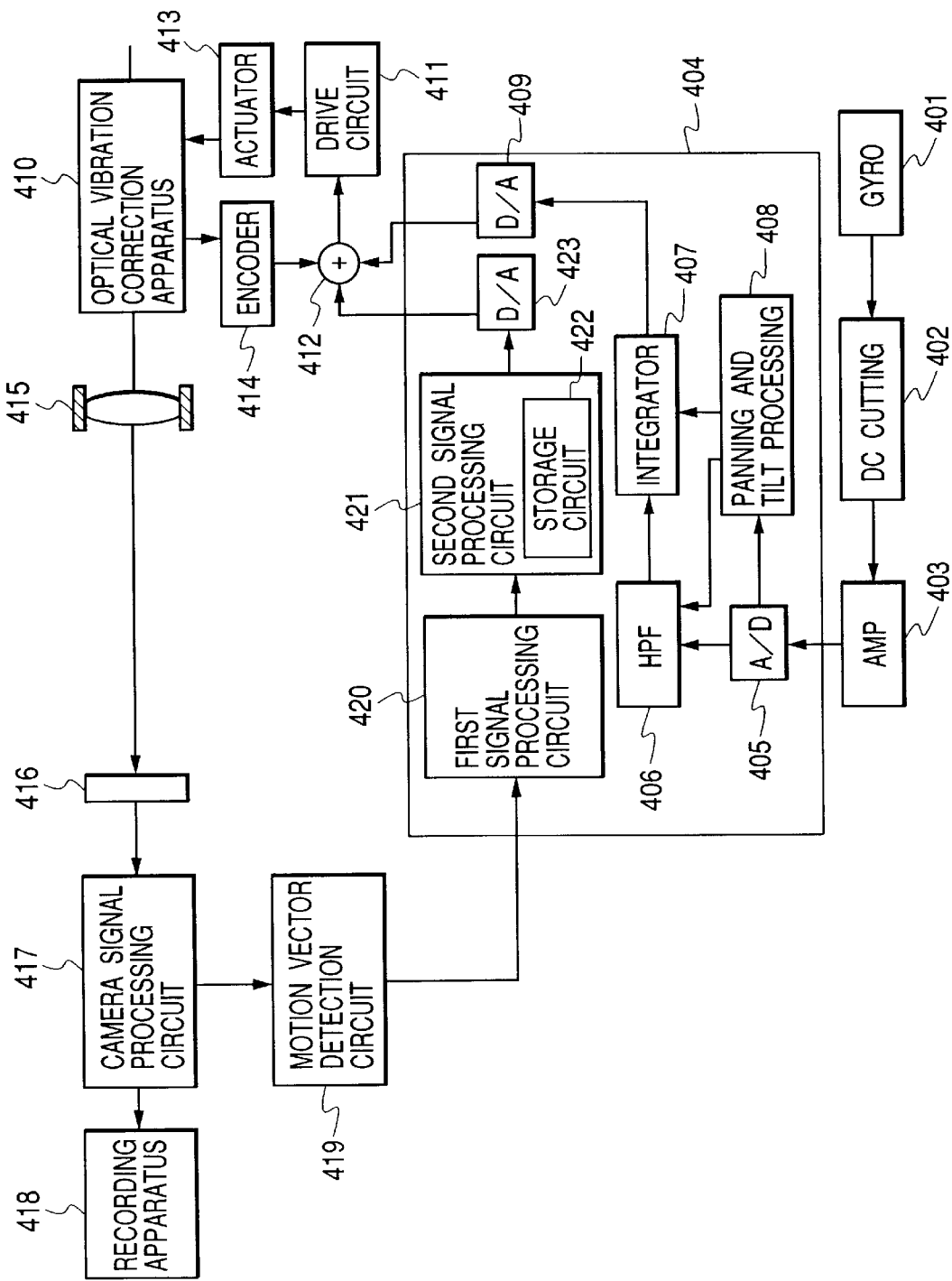

1/60sec  1/180sec

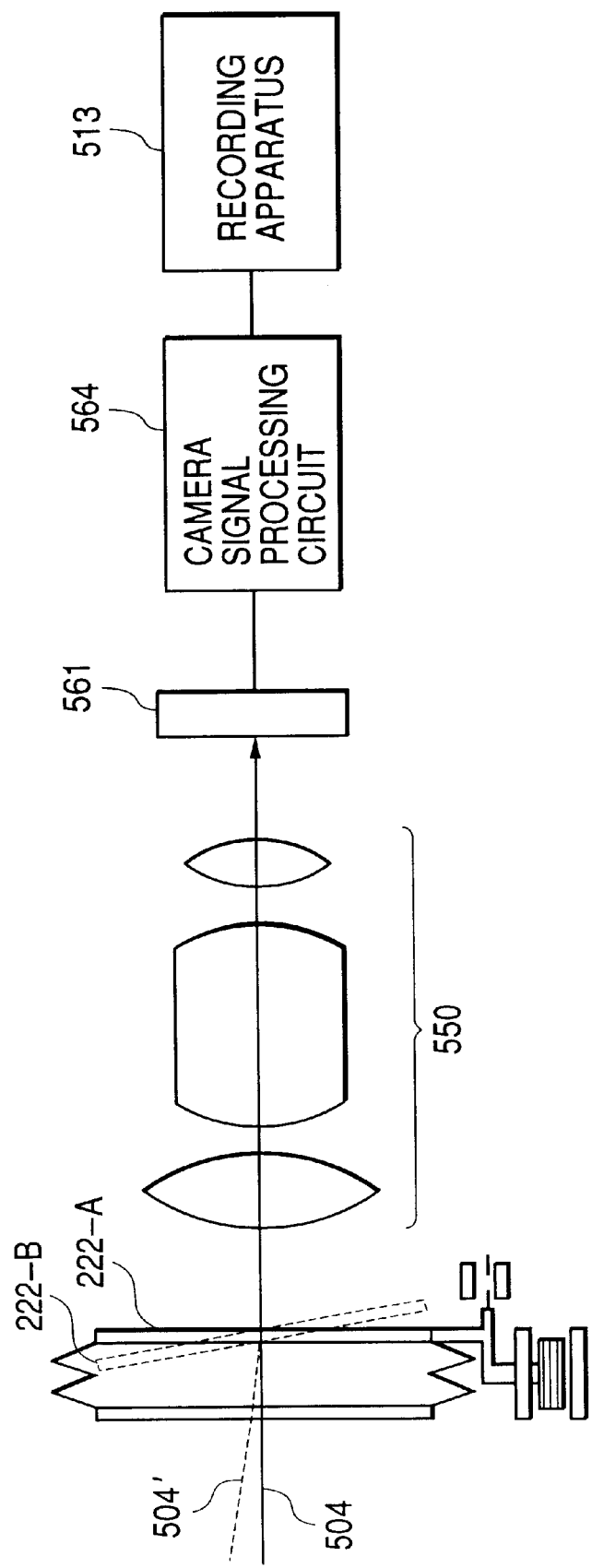

VIBRATION CORRECTION APPARATUS

BACKGROUND OF THE INVENTION

1. Field of the Invention

The present invention relates to a vibration correction apparatus.

2. Related Background Art

An image of a subject picked up with a compact video camera vibrates by hand vibrations or other vibrations, and this image becomes very unwatchable. Recently, video cameras using a high magnification factor lens have been used widely, so that a vibration becomes conspicuous particularly when the lens is located in a telephoto side.

A number of video cameras having a vibration correction function of correcting such a vibration have been proposed and manufactured.

For example, a video camera having a vibration correction function (hereinafter simply called a video camera) optically corrects a vibration of an image. To this end, the video camera is provided with an angular velocity sensor for detecting vibrations such as hand vibrations and a variable angle prism (VAP) for correcting the image in accordance with the detected vibration.

In such a video camera, a filtering process is performed in which after the d.c. components of a signal detected with an angular velocity sensor are removed and the signal is amplified, the low frequency components thereof are cut. With this filtering process, a target value of an apex angle of VAP is obtained, and in accordance with the target value, the apex angle of VAP is changed to optically correct a vibration of an image.

There is a video camera whose lens unit can be replaced, the lens unit being constituted of an angular velocity sensor and VAP. This video camera can broaden a photographing range.

However, a sensitivity of detecting a vibration with the angular velocity becomes lower in the lower frequency band. The phase in the low frequency band becomes not ideal because of signal processing or the like. Therefore, the conventional video camera gives a user a poor performance of vibration correction in the low frequency band. This problem becomes more conspicuous if the video camera uses a high magnification factor lens.

In view of this, it has been proposed to improve the performance of vibration correction in the low frequency band by using both a motion between fields of picked-up images and a motion detected with an angular velocity sensor. However, since the sampling period of detecting an image motion is slow and the target value of the apex angle of VAP is changed (renewed) at this period, an image with a low resolution is formed, or since the field period is slow, VAP may vibrate or produce sounds.

In order to solve these problems, the present applicant has filed a method of driving a correction system (VAP) at a shorter period than the motion detection period (JP-A-08-304672) to allow a smooth correction operation.

However, if an interpolator is used for raising an renewing period of the target value of an apex angle of VAP, the interpolator suitable for each television system is required because the sampling period of detecting an image motion changes with the television system. Similarly, in the case of a video camera having a detachable lens unit, if an interpolator is provided in the lens unit, the lens unit matching the television system is required.

With such a configuration, the apparatus structure becomes complicated, and the replacement of the lens unit becomes essential, resulting in a very cumbersome work.

With the further studies after the above-cited application was filed, it has been found that a precision of interpolation calculation is effected by an operation of a correction system so that the calculation precision is required to be improved or other measures are required to be performed.

It has also been found that there is some room in studying the optimization of the characteristics of a panning/tilting operation.

SUMMARY OF THE INVENTION

The present invention has been made in order to solve the above problems. It is a first object of the present invention to allow a vibration correction operation to be always good and highly precise, irrespective of what type of an image pickup system is utilized.

In order to achieve the first object of the invention, a preferred embodiment discloses an image pickup apparatus comprising: image pickup means for picking up an image of a subject and generating an image signal; motion detecting means for detecting a motion of the image from the image signal generated by the image pickup means; generating means for generating a correction target value in accordance with a detection result by the motion detecting means; correcting means for correcting a motion of the image in accordance with the correction target value generated by the generating means; and control means for controlling to make variable a sampling period of the correction target value generated by the generating means, in accordance with an image pickup system or a television system.

It is a second object of the present invention to improve the characteristics of a correction system by shortening a correction period shorter than a vibration detection period, and to always allow a high precision correction system control irrespective of any operation state of the correction system.

In order to achieve the second object of the invention, a preferred embodiment discloses an image pickup apparatus comprising: motion vector detecting means for detecting a motion vector signal at a predetermined sampling period; first signal processing means for calculating a correction target value in accordance with the motion vector signal detected by the motion vector detecting means; second signal processing means for storing the correction target value calculated by the first signal processing means and outputting a correction target value obtained through time-division of the stored correction target value until the next sampling time, in accordance with the motion vector signal detected by the motion vector detecting means; and optical vibration correcting means for correcting a vibration of an image in accordance with the correction target value time-divided by the second signal processing means.

It is a third object of the present invention to optimize the control of the correction system during the panning/tilting and camera fixed operations.

In order to achieve the third object of the invention, a preferred embodiment discloses an image pickup apparatus comprising: motion detecting means for detecting a motion vector of an image on an image pickup plane; vibration detecting means for detecting a vibration amount of the image pickup apparatus; first signal processing means for calculating a first correction target value in accordance with a vibration amount signal detected by the vibration detecting means; optical vibration correcting means for correcting a vibration of an image; and second signal processing means for calculating a second correction target value by weighing the motion vector detected by the motion detecting means, in accordance with both or one of output signals from the vibration detecting means and the first signal processing circuit.

Another object of the present invention to improve the precision of a correction system by shortening a correction period shorter than a vibration detection period, and to allow a necessary interpolation process or the like to be performed smoothly and at high precision.

The other objects and features of the invention will become more apparent from the following detailed description of the embodiment when read in conjunction with the accompanying drawings.

BRIEF DESCRIPTION OF THE DRAWINGS

FIG. 3 is a flow chart illustrating the operation of an interpolator for interpolating a correction target value of an optical motion correction apparatus of the video camera shown in FIG. 1.

FIG. 5 is a timing chart illustrating a displacement of a motion correction signal during a motion vector detection process of a vibration correction apparatus proposed before this application.

FIG. 6 is a block diagram showing a vibration correction apparatus according to a second embodiment of the invention.

FIG. 18 is a diagram illustrating the structure and operation of the variable angle prism.

DETAILED DESCRIPTION OF THE PREFERRED EMBODIMENTS

Embodiments of an image pickup apparatus of this invention will be described in detail.

Figure 1:
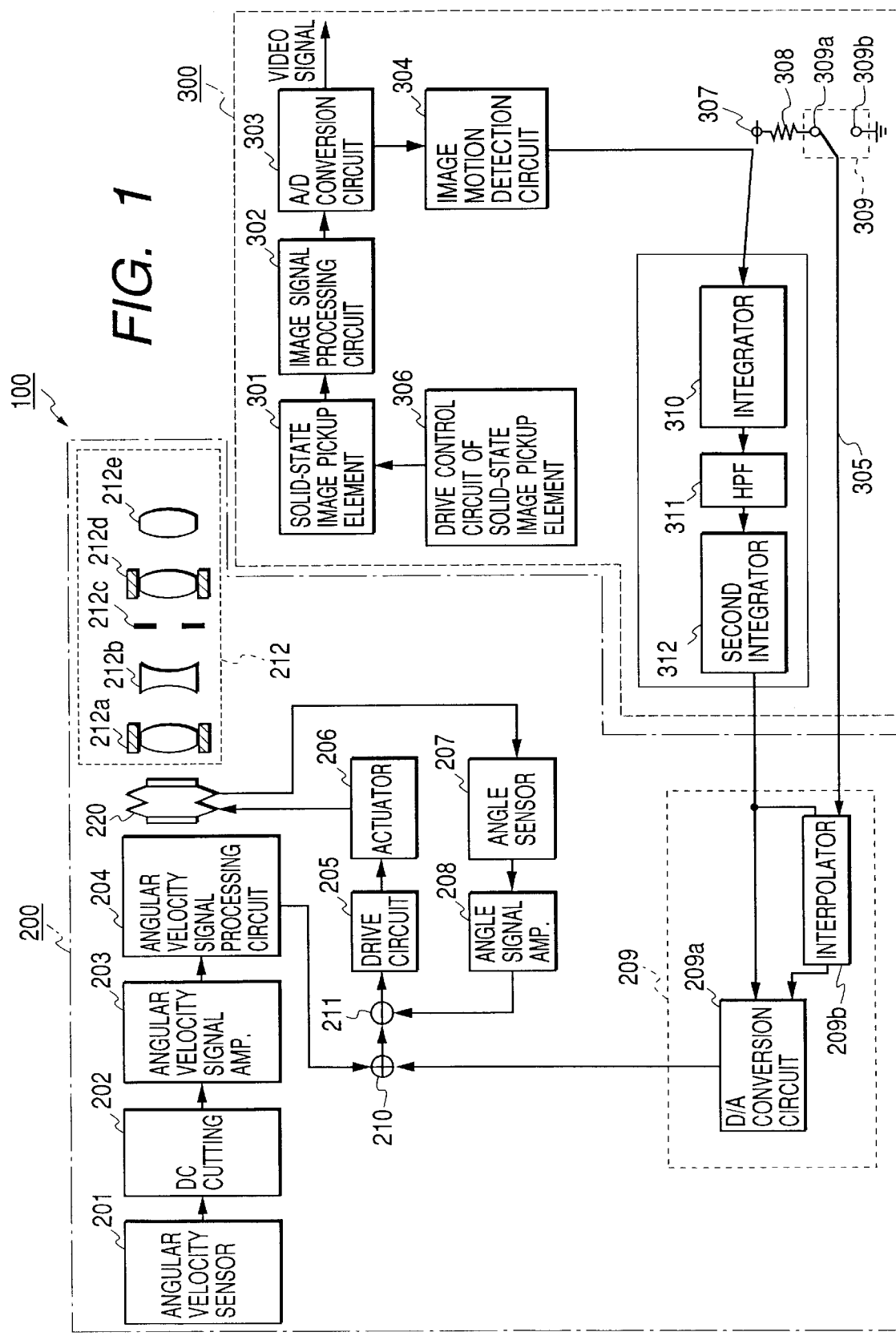
FIG. 1 is a block diagram showing an image pickup apparatus applied to a video camera according to a first embodiment of the invention.

FIG. 1 is a block diagram showing a video camera embodying the present invention.

As shown in FIG. 1, this video camera 100 has a lens unit 200 provided with a vibration correcting function of optically correcting a vibration of an image, the lens unit 200 being detachably mounted on a camera main body 300.

The lens unit 200 is constituted of: an angular velocity sensor 201; a d.c. (direct current) cut filter (hereinafter described as a DC cut filter) 202 supplied with an output of the angular velocity sensor 201, an amplifier (angular velocity signal amplifier) 203 supplied with an output of the DC cut filter 202; a signal processing circuit (angular velocity signal processing circuit) 204 supplied with an output of the amplifier 203; a driver circuit 205 supplied with an output of the signal processing circuit 204 via an adder 210 and a subtractor 211; an actuator 206 supplied with an output of the driver circuit 205; a VAP 220 supplied with an output of the actuator 206; an apex angle sensor 207 for detecting an apex angle of VAP 220, and an amplifier (apex angle signal amplifier) 208 supplied with an output of the apex angle sensor 207. An output of the amplifier 208 is supplied via the subtractor 211 to the driver circuit 205.

The lens unit 200 is also provided with an optical system 212 upon which light of an unrepresented subject becomes incident via VAP 220, and with a microcomputer (hereinafter called a lens microcomputer) 209.

The optical system 212 is constituted of a first fixed lens 212a, a zoom lens 212b, an aperture 212c, a second fixed lens 212d, and a focus lens 212e, sequentially mounted in this order from the subject side.

The lens microcomputer 209 is constituted of a digital/analog (D/A) conversion circuit 209a and an interpolator 209b respectively supplied with an output from the camera main body 300. An output of the interpolator 209b is supplied to the D/A conversion circuit 209a, and an output of the D/A conversion circuit 209a is supplied as an output of the lens microcomputer 209 of the driver circuit 205 via the adder 210 and subtractor 211.

The lens unit 200 has in practice two systems, one being a vertical direction detection unit for detecting a vibration in a vertical (pitch) direction and the other being a horizontal direction detection unit for detecting a vibration in a horizontal (yaw) direction. Each detection unit has the structure shown in FIG. 1.

For the simplicity of description, the following description is given by using one of the two systems, either the vertical or horizontal direction detection unit.

The camera main body 300 is constituted of: an image pickup element (solid-state image pickup element) 301 upon which light from the optical system 212 of the lens unit 200 becomes incident; a signal processing circuit (image signal processing circuit) 302 supplied with an output of the image pickup element 301; an A/D conversion circuit 303 supplied with an output of the signal processing circuit 302; an image motion detection circuit 304 supplied with an output of the A/D circuit 303; an integrator 310 supplied with an output of the image motion detection circuit 304; a high pass filter (hereinafter described as HPF) supplied with an output of the integrator 310, a second integrator 312 supplied with an output of HPF 311; and a drive control circuit (solid state element drive control circuit) 306 for controlling the image pickup element. An output of the A/D conversion circuit 303 is supplied to an unrepresented recording system, a range finder system and the like, and an output of the second integrator 312 is supplied to the D/A conversion circuit 209a and interpolator 209b respectively of the lens microcomputer 209 of the camera unit 200.

The camera main body 300 is also equipped with a terminal 307 connected to a positive power supply, a pull-up resistor 308 connected to the terminal 307 and a switch 309. One terminal 309a of the switch 309 is connected to the pull-up resistor 308 and the other terminal 309b is connected to a negative power supply.

An output from the switch 309 is supplied via a signal line 305 to the interpolator 209b of the lens microcomputer 209 of the lens unit 200.

First, VAP 220 provided in the video camera 100 will be described.

Figure 2:
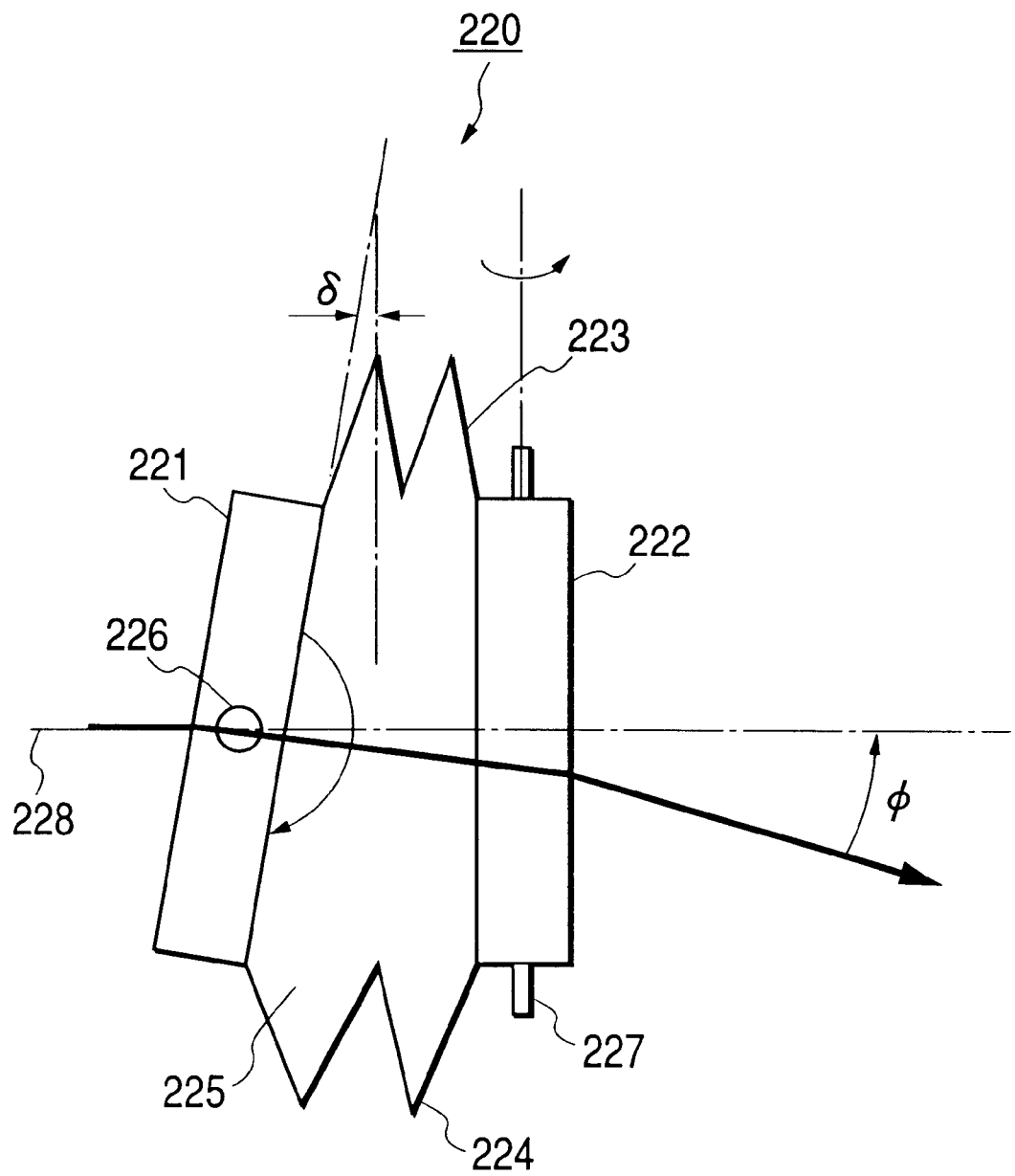
FIG. 2 is a diagram showing the structure of a variable angle prism.

VAP 220 is constituted of, for example as shown in FIG. 2, two opposing glass plates 221 and 222, bellows 223 and 224 coupling the two glass plates 221 and 222, and high refractive index liquid 225 filling the space hermetically sealed with the glass plates 221 and 222 and bellows 223 and 224.

The glass plates 221 and 222 have their rotary shafts 226 and 227. The rotary shaft 226 rotates the glass plate 221 in the up/down direction (pitch direction), and the rotary shaft 227 rotates the glass plate 222 in the right/left direction (yaw direction).

If the glass plate 221 of VAP 220 is rotated about the rotary shaft 226 by an angle δ, an incident light flux 228 deflects by an angle φ by the same principle as a wedge shape prism. Similarly, if the other glass plate 222 is rotated about the rotary shaft 227, the incident light flux 228 deflects.

Therefore, as the actuator 206 driven by the driver circuit 205 rotates the two glass plates 221 and 222, an apex angle (hereinafter called a VAP apex angle) defined by the two glass plates 221 and 222 can be varied. The angular velocity sensor is provided both in the pitch and yaw directions, the DC components of output signals of the angular velocity sensors are cut by the DC cut filters to derive only the vibration components from the output signals. The vibration components are further filtered in a predetermined manner to detect an amount of vibration caused by hand vibrations or other vibrations. VAP is driven along two axes (pitch and yaw) at the same time by a VAP apex angle corresponding to the vibration amount, so that a vibration of a subject image in a two-dimensional place can be eliminated.

Next, the operation of the video camera 100 will be described.

First in the lens unit 200, the angular velocity sensor 201 detects a vibration of the video camera 100 and supplies a detected signal to the DC cut filter 202.

The DC cut filter 202 cuts the DC components of the detected signal by the angular velocity sensor 201 and supplies the remaining components to the amplifier 203.

The amplifier 203 amplifies the detected signal supplied from the DC cut filter 202 to a level necessary for vibration correction, and supplies it to the signal processing circuit 204.

The signal processing circuit 204 processes the detected signal supplied from the amplifier 203 in a predetermined manner to generate a first target value of the VAP apex angle of VAP 220.

A VAP apex angle of VAP 220 is detected with the apex angle sensor 207. This detected angle is amplified by the amplifier 208 by a predetermined amount and supplied to the subtractor 211.

Generally in this case, a difference between the first target value output from the signal processing circuit 204 and an output of the amplifier 208 is supplied as a control amount to the driver circuit 205 which in turn drives the actuator 206 in accordance with the input control amount to thereby optically correct a vibration of the image.

With such an arrangement, however, as described earlier, a user feels that the effects of vibration correction performance in the low frequency band are poor.

In this embodiment, to avoid this, the lens microcomputer 209 generates a second target value of the VAP apex angle of VAP 220, and in accordance with an addition value of the second target value and the first target value obtained as above, the actuator 206 is driven to optically correct any vibration of the image. Renewing the second target value is performed at a period synchronous with a signal output from the interpolator 209b and in conformity with the television system.

Specifically, light from a subject is incident upon an unrepresented image pickup plane of the solid state image pickup element 301 sequentially via VAP 220 and optical system 212.

In this case, the drive control circuit 306 controls the solid state image pickup element 301.

The solid state image pickup element 301 converts incident light into electrical signals (hereinafter called image signals) which are supplied to the signal processing circuit 302.

The signal processing circuit 302 processes the image signal from the solid state image pickup element 301 in a predetermined manner and supplies the processed image signal to the A/D converter 303.

The A/D converter 303 digitizes the image signal supplied from the signal processing circuit 302 into image data which is supplied to a recording system, a range finder system and the like, and also to the image motion detection circuit 304.

The image motion detection circuit 304 derives an image motion vector from the image data supplied from the A/D converter 303, the image motion vector representing a motion of images between fields. This image motion vector is supplied sequentially via the integrator 310, HPF 311 and second integrator 312, to the lens microcomputer 209 of the lens unit 200.

In the lens microcomputer 209, the D/A conversion circuit 209 converts the signal from the camera main body 300 into an analog signal which is output as the second target value.

The D/A conversion circuit 209 holds its output value until data is updated.

The second target value as the output of the D/A conversion circuit 209a is supplied to the adder 210. At this time, the adder 210 is also supplied with the first target value output from the signal processing circuit 204.

The adder 210 adds together the first target value from the signal processing circuit 204 and the second target value from the D/A conversion circuit 209a.

Specifically, since the detection performance of low frequency components by the image motion detection circuit 304 is superior to the detection performance of the angular velocity sensor 201, the second target value generated by the image motion detection circuit 304 having a high detection performance of low frequency components is added by the adder 210 to the first target value generated by the angular velocity sensor 201.

In this case, if the second target value is updated at the low sampling period while detecting the image motion vector by the image motion detection circuit 304, an image having a low resolution may be formed as described earlier.

In order to avoid this, a television system such as an NTSC system and a PAL system is preset from the switch 309 which outputs an identification signal of the television system and supplies it via the signal line 305 to the interpolator 209b.

Although the details are omitted, if, for example, the interpolator 209b recognizes the television system as the NTSC system in accordance with the identification signal supplied from the signal line 305, it generates an interpolation value allowing the first and second target values to be added at a period of 120 Hz, and outputs the interpolation value to the D/A conversion circuit 209a.

In accordance with the interpolation value from the interpolator 209b, the D/A conversion circuit 209a supplies the second target value generated in the manner described above, to the adder 210.

Therefore, for example, if the television system is the NTSC system, the adder 210 adds together the first and second target values at a period of 120 Hz, and supplies the addition result to the subtractor 211.

The subtractor 211 calculates a difference between the addition result from the adder 210 and the signal (detected result of the VAP apex angle of VAP 220) from the amplifier 208, and supplies the difference as the control amount to the driver circuit 205.

In accordance with the control value from the subtractor 211, the driver circuit 205 drives the actuator 206.

Then, the two glass plates 221 and 222 of VAP 220 are rotated to alter the VAP apex angle, to thereby correct a vibration of images.

Next, the operation of the interpolator 209b will be specifically described with reference to the flow chart of FIG. 3.

First, since the image motion detection circuit 304 detects any motion of images between fields, if the television system is the NTSC system, then the second integrator 312 performs a calculation sixty times per second, and supplies the data of the calculation result (integrated value) to the lens microcomputer 209.

At the timing when this data supply is completed, the interpolator 209b starts its operation (Step S1).

If the television system is the PAL system, the second integrator 312 performs a calculation 50 times per second.

Next, the interpolator 209b calculates a difference between the integrated value supplied from the second integrator 312 and the previous integrated value stored in an unrepresented memory Z, adds a half of the difference to the integrated value supplied from the second integrator 312, and stores the addition result in an unrepresented memory H (Step S2).

Next, the interpolator 209b stores the integrated value supplied from the second integrator 312 in the memory Z (Step S3).

The integrated value stored in the memory Z is used at the next processing.

Next, the interpolator 209b judges whether a predetermined time (T second) has lapsed (Step S4).

The interpolator 209b has a counter function of counting a predetermined time (T second).

For example, this predetermined time (T second) is set to $\frac{1}{120}$ second if the television system is the NTSC system and to $\frac{1}{100}$ second for the PAL system, in accordance with the identification signal supplied to the interpolator 209b via the signal line 305.

If the judgement result at Step S4 indicates a lapse of the predetermined time (T second), the interpolator 209b supplies the value (interpolation value) stored in the memory H as described above to the D/A conversion circuit 209a (Step S5) to terminate the current processing (Step S6).

Figure 4A:
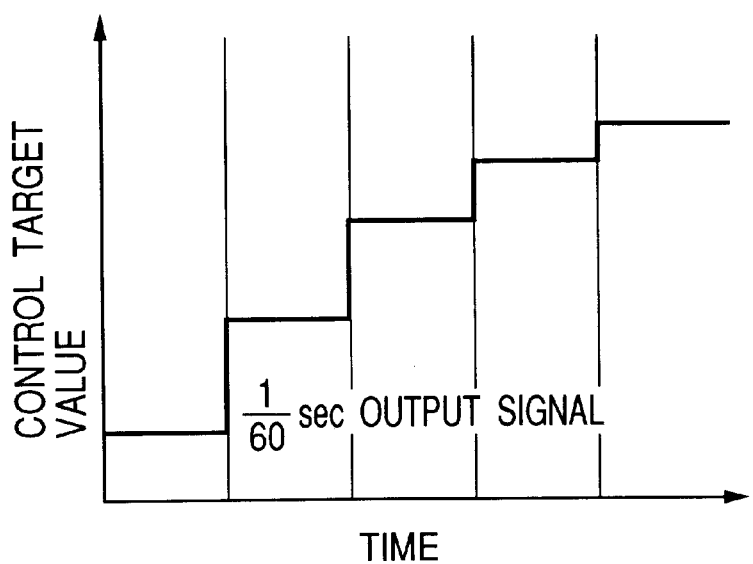
FIGS. 4A and 4B are diagrams illustrating a change in the second target value used by the video camera.
Figure 4B:
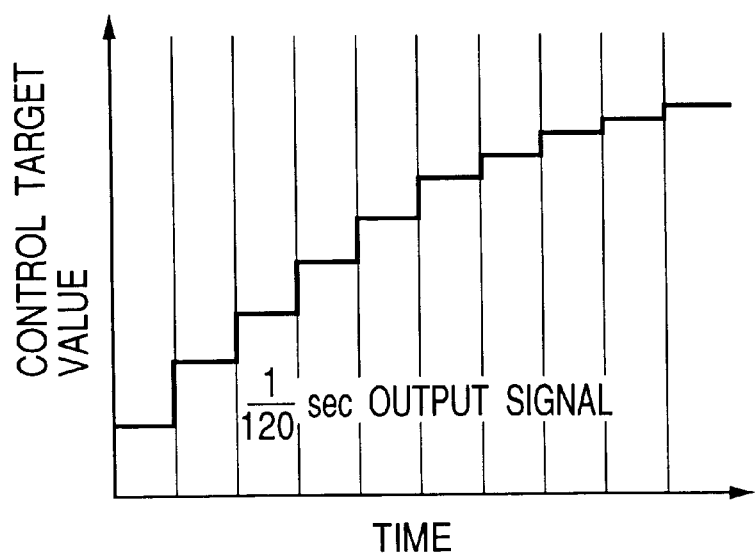

FIGS. 4A and 4B illustrate a difference between second target values output from the D/A conversion circuit 209a, when the interpolator 209b is provided or not provided.

FIGS. 4A and 4B assume that the television system is the NTSC system.

FIG. 4A shows a change in the second target value output from the D/A conversion circuit 209a when the interpolator 209b is not provided. As shown, the second target values vary at the sampling period ($\frac{1}{60}$ sec) of detecting the image motion vector by the image motion detection circuit 304.

In contrast with the above, FIG. 4B shows a change in the second target value output from the D/A conversion circuit 209a when the interpolator 209b is provided. As shown, the second target values vary at the sampling period ($\frac{1}{120}$ sec) slower than the sampling period ($\frac{1}{60}$ sec) of detecting the image motion vector by the image motion detection circuit 304.

Therefore, provision of the interpolator 209b can solve the conventional problem associated with a low sampling period of the target value to be supplied to VAP as an optical vibration correction apparatus, if outputs of both the angular velocity sensor and image motion detection circuit are used in order to improve the performance of the optical vibration correcting function in the low frequency band.

Even if the television system changes, the same interpolator 209b can be used in common.

As a result, even in a video camera having a lens unit with the angular velocity sensor, VAP and the like mounted detachably on the camera main body, the same lens unit can be used for different television systems.

The invention can therefore improve the vibration correction performance and obtain a high quality image, without complicating the system configuration.

In the above embodiment, although the video camera 100 has the lens unit 200 detachably mounted on the camera main body 300, the invention is not limited only to this, but a video camera with the lens unit 200 and camera main body 300 integrally mounted may also be used.

In detecting a motion of images, although a motion of images between fields is detected, a motion between frames may be detected.

The invention may be applied to either a system constituted of a single apparatus such as shown in FIG. 1, or a system constituted of a plurality of apparatuses.

As described so far, the sampling period of a correction target value to be supplied to a correction circuit for correcting a vibration of images is controlled in accordance with a preset television system. It is therefore possible to set the sampling period of correction target values shorter than that of detecting a motion of images. Since the sampling period of detecting a motion of images is short, an image quality deterioration to be caused by a low sampling period of correction target values can be prevented. Since the sampling period of correction target values can be set by a control circuit, in accordance with the preset television system, any type of television system can be dealt with. Since the sensitivity of detecting a vibration in the low frequency band can be improved, the vibration correction performance in detecting a motion of images or the like can be improved and a high quality image can be obtained without complicating the apparatus configuration.

In order to incorporate a lens interchangeable system, a television system set by a setting circuit of the apparatus is notified to a control circuit of the lens unit to determine the operation timing of the lens unit in accordance with the notified television system. Therefore, even if the television system changes, it is not necessary to prepare a lens unit for each television system, but only a single lens unit can be shared in common.

Other embodiment of the invention will be described.

A second embodiment of the invention will be described.

As stated previously, in order to suppress the sensitivity of an angular velocity sensor from being lowered in the low frequency range, it has been proposed to operate the correction system by additionally using motion information derived from an image signal to thereby improve the correction performance thereof in the low frequency band. Furthermore, in order to suppress vibrations and noises of VAP in the correction system to be caused by a motion detection period (field period) shorter than that of an image signal, it has been proposed to drive VAP at a period faster than the motion amount detection period. This embodiment further improves the above proposals.

In the NTSC system, a motion amount is detected at a period of 60 Hz, and correction target values are interpolated to drive VAP at a period of 120 Hz, for example. With this correction method, correction data is calculated by weighing a difference between the current detection amount and previous detection amount by a predetermined factor.

FIG. 5 shows motion amount detection results and a change in target positions of operating VAP. In FIG. 5, the ordinate represents a VAP correction signal, and the abscissa represents time. A bold solid line indicates motion detection and correction at a period of 1/60 second without interpolation, and a chain line indicates timings of interpolating correction signals at a period of 1/60 second, resulting in correction at a period of 1/120 second.

Interpolation data H1 to be output at a timing T1 is calculated from H1=B+(B−A)/2.

If the detection results increase or decrease in one direction, good interpolation data can be obtained and the problems described above can be solved.

However, there occurs a problem if the direction of the detection result or correction signal changes. Specifically, the interpolation data output at a timing T2 is ideally H3. However, interpolation is always performed by using the previous signal so that the interpolation data becomes H2. A difference from the next detection result E, therefore, becomes larger.

If the direction of the detection result is reversed, the problem of vibrations and noises becomes worse.

In this embodiment, therefore, vibrations and noises of this problem are suppressed always independently from the direction of the detection result of image motion information additionally incorporated for correction of image motions.

In this embodiment, in order to solve the above problems, an image pickup apparatus is disclosed which comprises: a motion vector detecting circuit for detecting a motion vector signal at a predetermined sampling period; a first signal processing circuit for calculating a correction target value in accordance with the motion vector signal detected by the motion vector detecting circuit; a second signal processing circuit for storing the correction target value calculated by the first signal processing circuit and outputting a correction target value obtained through time-division of the stored correction target value until the next sampling time, in accordance with the motion vector signal detected by the motion vector detecting circuit; and an optical vibration correction apparatus for correcting a vibration of an image in accordance with the correction target value time-divided by the second signal processing circuit.

Also in this embodiment, a vibration correcting apparatus is provided which comprises: a motion detecting circuit for detecting a motion vector signal at a predetermined sampling period; a first signal processing circuit for calculating a correction target value in accordance with the motion vector signal detected by the motion detecting circuit; a second signal processing circuit for storing the correction target value calculated by the first signal processing circuit and outputting a correction target value obtained through time-division of the stored correction target value until the next sampling time, in accordance with the motion vector signal detected by the motion detecting circuit; a vibration detection unit for detecting a vibration amount of the vibration detection apparatus; a third signal processing circuit for calculating a correction target value in accordance with a vibration signal detected by the vibration detection unit; and an optical vibration correcting circuit for correcting a vibration of an image in accordance with both or one of outputs from the second and third signal processing circuits.

This embodiment will be described with reference to the related drawings.

FIG. 6 is a diagram showing the structure of the second embodiment of this invention.

In FIG. 6, reference numeral 401 represents an angular velocity detector made of an angular velocity sensor such as a vibration gyro, and reference numeral 402 represents a DC cut filter for cutting the DC components of an angular velocity signal output from the angular velocity detector 401 and passing the alternating current components (vibration components). This DC cut filter may be a high pass filter (HPF) for cutting signals in a predetermined band.

Reference numeral 403 represents an amplifier for amplifying the angular velocity signal output from the DC cut filter 402 to a proper level. The amplified angular velocity signal from the amplifier 403 is input to an A/D converter 405 of a control circuit 404, and converted into a digital signal which is supplied to a control circuit 404 constituted of a microcomputer (COM) for example. Reference numeral 406 represents a high pass filter (HPF) for cutting low frequency components of an output of the A/D converter 5, HPF having a function of changing its characteristics in an optional band.

Reference numeral 407 represents an integration circuit for integrating an output (angular velocity signal) of HPF 406 and outputting an angular displacement signal, the integration circuit having a function of changing its characteristics in an optional band.

Reference numeral 408 represents a panning/tilting discrimination circuit for judging from the angular velocity signal and angular displacement signal whether a operation mode is a panning/tilting operation. The panning/tilting discrimination circuit 408 controls a panning/tilting operation by setting the band characteristics of HPF 406 and the integration circuit 407 in accordance with the levels of the angular velocity signal and angular displacement signal.

Reference numeral 409 represents a D/A converter for converting an output of the integration circuit 407 into an analog signal and supplying it via an adder 412 to a drive circuit 411 which drives an image correction apparatus 410 at the succeeding stage. For example, the image correction apparatus 410 is a variable angle prism (VAP) which constitutes a closed loop circuit for controlling a drive amount, together with an actuator 413, an encoder 414, the adder 412 and the drive circuit 411. The actuator 413 may be a voice coil motor, and the encoder 414 detects a drive amount, i.e., angular displacement which is input via the adder 412 to the drive circuit 411.

With the structure described above, in accordance with hand vibrations or external vibrations detected with the angular velocity detector 401, the image correction apparatus 410 is controlled to displace the optical axis and optically compensate for the vibration. A light flux displaced by the image correction apparatus 410 is focussed via a taking lens 415 upon an image pickup plane of an image pickup element 416, processed by a camera signal processing circuit 417, and recorded in a recording apparatus 418 such as a VTR.

In FIG. 6, reference numeral 419 represents a motion vector detection circuit which detects an image motion vector from image signals supplied from the camera signal processing circuit 417. This motion vector detecting method may be a method well known in this field. For example, representative points are set to an image frame, the positions of the representative points are detected at a field period, and the motion direction and amount of an image are detected from the changed directions and amounts of the representative points.

In the NTSC system, a motion vector is detected at a field period, i.e., at a period of 1/60 second. The angular velocity detected with the angular velocity detection circuit 419 is the motion components of the image signal after the vibration thereof was optically corrected, and so it indicates an error (correction remainder) of the vibration correction designated by the angular velocity detector 401. This error signal is normalized as the motion vector amount on the image pickup plane and input to the control circuit 404 in which a first signal processing circuit 420 calculates a motion amount of VAP necessary for compensating for the motion vector amount, i.e., a first stage correction target value.

The correction target value output from the first signal processing circuit 420 is processed by a second signal processing circuit 421 which forms a characteristic feature of this invention and will be described later, and input via a D/A converter 423 to the adder 412.

Reference numeral 422 represents a storage circuit provided in the second signal processing circuit 421 and is used when the processing to be later described of this invention is performed.

With the structure described above, a motion vector signal is input to the closed loop circuit including the image correction circuit 410, as auxiliary information representative of the correction remainder of optical vibration correction, for the vibration correction operation.

The control circuit 404 may be constituted of discrete blocks as shown. If the control circuit 404 is realized by a microcomputer, each block corresponds to a process and a function realized by software in the microcomputer. In this embodiment, it is assumed that the control circuit 404 is constituted of a microcomputer.

Figure 7:
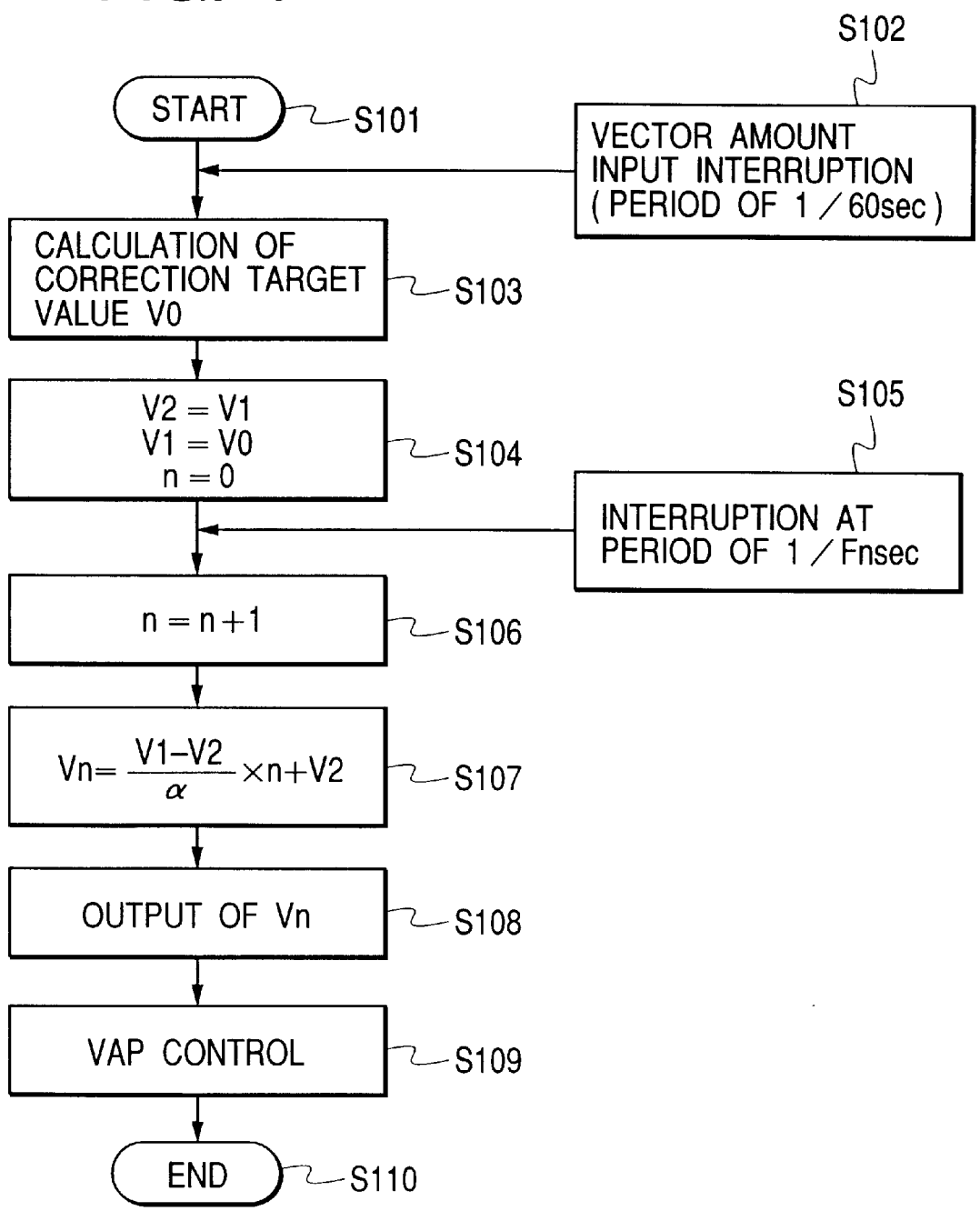
FIG. 7 is a flow chart illustrating a motion vector time division process.

Next, the processes to be executed by the signal processing circuit 421 of the control circuit 404 characteristic to this invention will be described with reference to the flow chart shown in FIG. 7. It is assumed herein that the image signal conforms with the NTSC system.

S101: After the power is turned on, the processes to be executed by the first and second signal processing circuits 420 and 421 start.

S102: The motion vector detection circuit 419 derives a motion vector at the NTSC field period (1/60 second).

S103: The derived motion vector is supplied to the first signal processing circuit 420 by an interrupt process which calculates as the first stage a motion amount of the optical vibration correction apparatus, for the compensation for the derived motion vector.

S104: Of variable storage areas V0, V1 and V2 in the storage circuit 422, the previous input value V1 is moved to V2, and the current input value V0 is moved to V1. A time division number n to be described later is set to "0".

S105: When each variable is set at Step S104, it is checked whether there is an interrupt of a correction target value division process. If there is an interrupt, the operation advances to Step S106.

This division number is determined basing upon whether a change amount of the correction target value calculated at Step S103 is divided into how many steps. The interrupt period 1/Fn is set to a period of the field period (1/60 second) divided by the division number. In this embodiment, the total time division number α is set to "3" and the period is set to 1/180 second.

S106: The time division number n is incremented by "1".

S107: An output value Vn is calculated from:

$$Vn=\{(V1-V2)/\alpha\}\times n+V2 \tag{1}$$

where a previous correction target value is V2, a current correction target value is V1, the total time division number is α, and the time division number is n.

If the time division is conducted at an interval of 1/Fn, the total time division number α becomes Fn/60.

S108: Vn calculated at Step S107 is output.

S109: Vn output at Step S108 is supplied via the D/A converter 423 to the adder 412, and then to the drive circuit 11 to drive the optical vibration correction apparatus (VAP) 410.

In this case, the adder 412 is also supplied with angular velocity information detected with the gyro 401 and output via the integration circuit 407 and D/A converter 409.

S110: The procedure is terminated.

Each time data is supplied from the motion vector detection circuit at an interval of 1/60 second at Step S102, the processes at S103 and following Steps are executed.

An interrupt process at Step S105 is conducted by activating an unrepresented timer in the control circuit 404 and generating an interrupt at an interval of the time division period of 1/Fn second. In this case, when an interrupt is issued at an interval of the time division period of 1/Fn by using the timer, the processes at Step S106 and following Steps are executed.

A change in the signal output from the D/A converter 423 under the operation of the second signal processing circuit 421 will be described with reference to FIG. 8.

Figure 8:
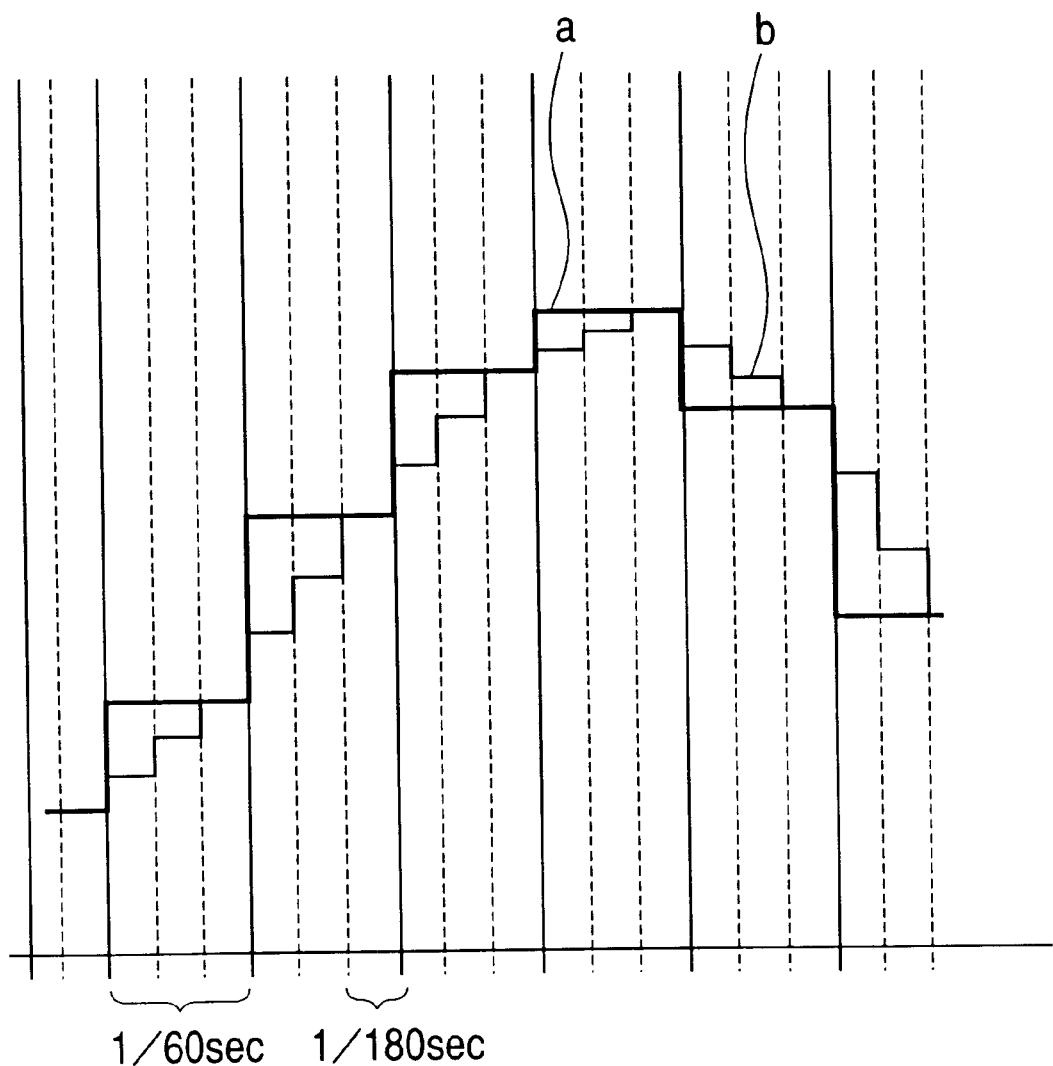
FIG. 8 is a timing chart showing a displacement of a motion vector time division output.

In FIG. 8, a pitch between solid line gradations in the time axis corresponds to 1/60 second, and a pitch between chain line gradations corresponds to ⅟₁₈₀ second. In this example, the total time division number α is assumed to be "3". If the second signal processing circuit 421 is not used, i.e., if the output of the first signal processing circuit 420 is supplied directly to the drive circuit 411 via the D/A converter 423 and adder 412, a signal indicated at a is output, whereas if the second signal processing circuit 421 is used, a signal indicated at b is output.

It is seen that the smoother and more stable waveform is obtained as compared to the drive waveform shown in FIG. 5.

As described above, in correcting an image by additionally using image motion information, an output signal supplied from the second signal processing circuit 420 via the D/A converter 423 can be made smoother so that the vibration correction apparatus can be operated smoothly, so that vibrations and noises are suppressed always independently from the direction regarding image motion information, and so that unnatural image motions to be caused by rapid image motions can be prevented.

In this embodiment, a variable angle prism is used as an example of the optical vibration correction apparatus. Similar advantageous effects can also be expected even when an optical axis is deflected by using a lens group movable in a direction perpendicular to the optical axis of the image pickup optical system.

A third embodiment of an image pickup apparatus of this invention will be described with reference to FIG. 9.

This embodiment is intended to be applied to a lens interchangeable system. The embodiment discloses an image pickup apparatus which comprises: a camera unit; and a lens unit detachably mounted on the camera unit, wherein the camera unit comprises: a motion detecting circuit for detecting a motion vector of an image on an image pickup plane; and a first signal processing circuit for calculating a correction target value in accordance with a motion vector signal detected by the motion detecting circuit, and the lens unit comprises: a vibration detecting circuit for detecting a vibration of the image pickup apparatus; a second signal processing circuit for storing the correction target value calculated by the first signal processing circuit and outputting a correction target value obtained through time-division of the stored correction target value until the next sampling time, in accordance with the motion vector signal detected by the motion vector detecting circuit in the camera unit; a third signal processing circuit for calculating a correction target value from a vibration signal detected by the vibration detecting circuit; and an optical vibration correcting circuit for correcting a vibration of an image in accordance with both or one of outputs of the second and third signal processing circuits.

Figure 9:
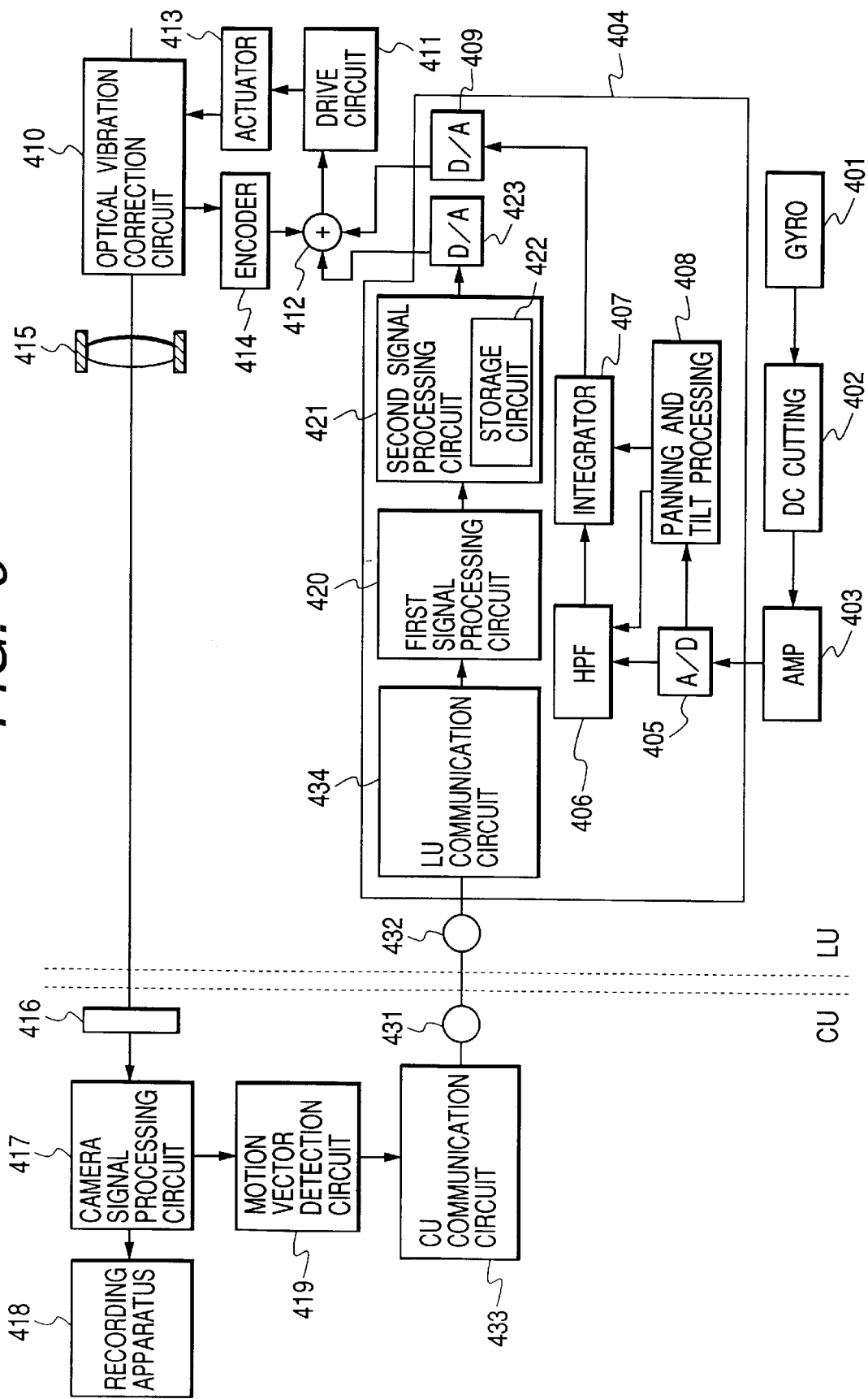
FIG. 9 is a block diagram showing a vibration correction apparatus according to a third embodiment of the invention.

In FIG. 9, similar constituent elements to those shown in FIG. 6 are represented by using identical reference numerals, and the detailed description thereof is omitted. A difference from the second embodiment is the structure that a camera unit (CU) and a lens unit (LU) can be separated.

A specific example of such a structure is a coupling method called a bayonet mount used with a single lens reflex camera.

In FIG. 9, reference numerals 431 and 432 represent electrical terminals of CU and LU which are connected when both the units are coupled by an unrepresented bayonet mount. Similar to the first embodiment, an image motion vector derived from the image signal by a motion vector detection circuit 419 is transferred to a control unit 404 via a CU communication circuit 433 and an LU communication circuit 434 at a predetermined timing synchronous with the vertical sync signal of a video signal.

These communication circuits may be any circuit which is provided with an electrical data transmission system such as serial data communications, and may be realized by the function of a microcomputer provided in CU and LU.

A motion vector amount transferred from CU to LU is converted into a correction target value by the first signal processing circuit 420, processed by the second signal processing circuit 421 in the manner similar to the first embodiment, and input via the D/A converter 423 to the adder 412.

With the structure described above, a motion vector signal is input to the closed loop circuit including the image correction circuit 410, as vibration correction auxiliary information, for the vibration correction operation. A change in the output signal of the D/A converter 423 is the same as the second embodiment shown in FIG. 8.

As described above, in the image pickup apparatus of the type that a camera unit (CU) and a lens unit (LU) can be separated, when the image is corrected on the side of LU by detecting image motion information on the side of CU, a signal output from the signal processing circuit 420 via the D/A converter 421 can be made smooth, the vibration correction apparatus can be operated smoothly, and vibrations and noises can be suppressed always independently from the direction regarding image motion information.

In this lens interchangeable system, the lens unit is provided with the image correction apparatus 410 and gyro 401 for detecting vibrations and the control circuit 404 for controlling the image correction apparatus 410 in accordance with the detected vibration amount, and the camera unit transmits the motion vector derived from the image signal to the control circuit 404 of the lens unit. It is therefore possible to simplify the structure of the camera unit and control the camera unit on the side of the lens unit, so that an optimum vibration correction control suitable for the characteristics of each lens unit can be performed.

In this embodiment, a variable angle prism is used as an example of the optical vibration correction apparatus. Similar advantageous effects can also be expected even when an optical axis is deflected by using a lens group movable in a direction perpendicular to the optical axis of the image pickup optical system.

As described above, in the first and second embodiments, in correcting an image by using image motion information or by additionally using the image information, a correction target value is calculated from image motion information and stored in a storage circuit, and the stored correction target value is time divisionally output until the next sampling time, thereby making the output signal smooth. Accordingly the optical vibration correction apparatus can be operated smoothly, and vibrations and noises can be suppressed always independently from the direction regarding image motion information.

As described earlier, a hybrid detection system including both vibration amount detection with an angular velocity sensor and image motion vector amount detection provides considerable merits of expanding the vibration correction band. On the other hand, with this hybrid detection system for vibration correction, detection vibration amount detection and image motion vector amount detection are required to be performed synchronously with the panning/tilting operation or with the camera fixing operation by a user. If each detection is performed independently, a problem of an unnatural image may occur.

This embodiment is intended to aim at forming a natural image by performing each detection operation synchronously with the panning/tilting operation or with the camera fixing operation, when the image vibration correction is performed by using both vibration amount detection with an angular velocity sensor and image motion vector amount detection.

In order to solve such an issue, the embodiment discloses an image pickup apparatus which comprises: a motion detecting circuit for detecting a motion vector of an image on an image pickup plane; a vibration detecting circuit for detecting a vibration amount of the image pickup apparatus; a first signal processing circuit for calculating a first correction target value in accordance with a vibration amount signal detected by the vibration detecting circuit; an optical vibration correcting unit for correcting a vibration of an image; and a second signal processing circuit for calculating a second correction target value by weighing the motion vector detected by the vibration detecting circuit, in accordance with both or one of output signals from the vibration detecting circuit and the first signal processing circuit.

A fourth embodiment of the image pickup apparatus of this invention will be described with the related drawings.

Figure 10:
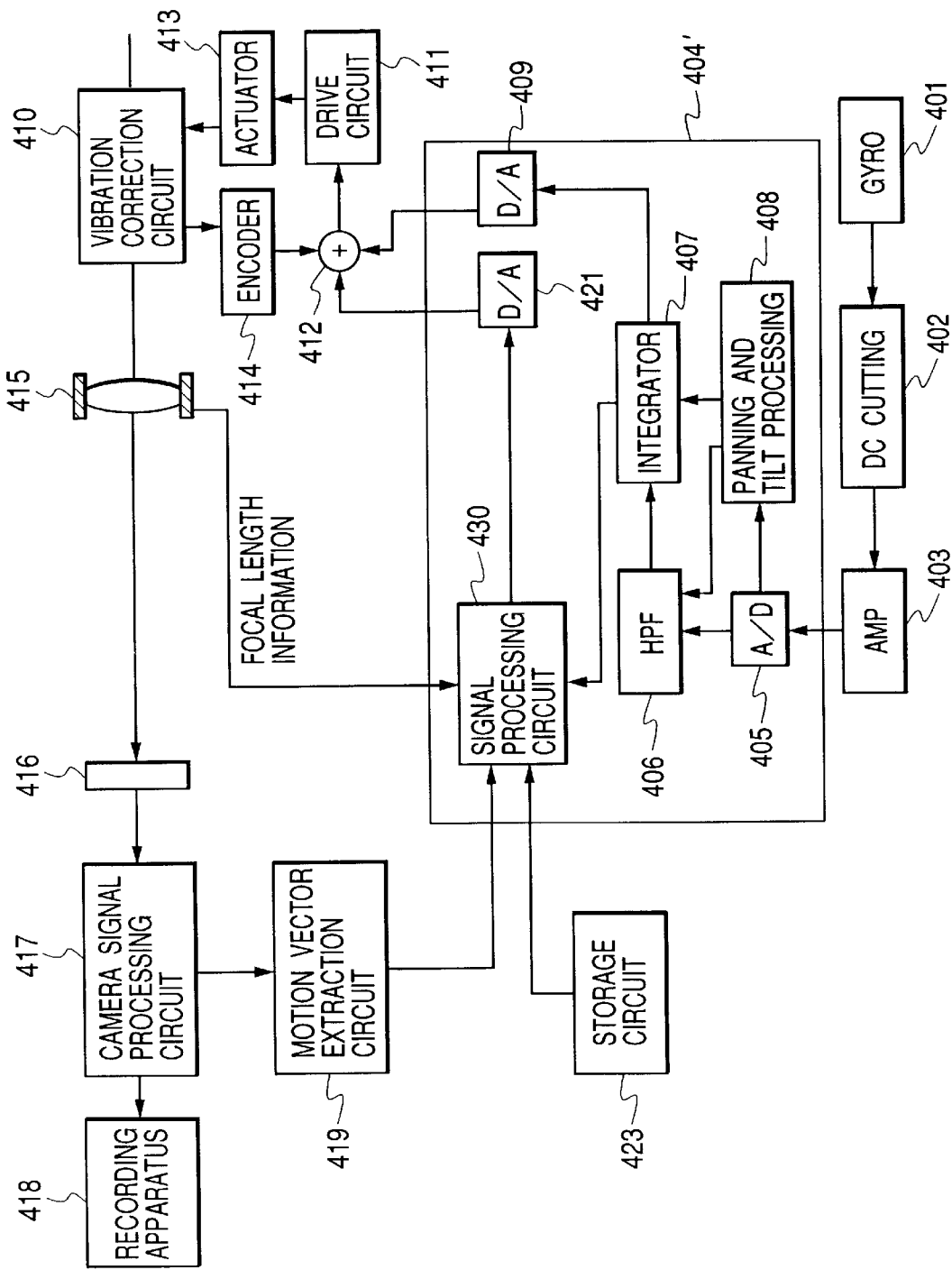
FIG. 10 is a block diagram showing a vibration correction apparatus according to a fourth embodiment of the invention.

FIG. 10 shows the structure of the fourth embodiment of the invention. In FIG. 10, similar constituent elements to those of the second embodiment shown in FIG. 6 are represented by using identical reference numerals, and the detailed description thereof is omitted.

A difference from the second embodiment shown in FIG. 6 is the control process to be executed by a control circuit 404'. The control circuit 404' may be realized by a microcomputer (COM) to which input is a motion vector derived from an image signal by a motion vector detection circuit 419.

A panning/tilting discrimination circuit 408 judges from the angular velocity signal and angular displacement signal whether an operation mode is a panning/tilting operation. The panning/tilting discrimination circuit 408 controls a panning/tilting operation by setting the band characteristics of HPF 406 and the integration circuit 407 in accordance with the levels of the angular velocity signal and angular displacement signal. More specifically, the cut-off frequency of the detection system is shifted to a higher frequency side, and a sensitivity of detecting an image motion in the low frequency band is lowered. Detection information on the panning/tilting operation is supplied to an integration circuit 407 and to a signal processing circuit 430 and is used for the control of a correction gain when a correction amount is calculated.

The signal processing circuit 430 is also supplied with a focal length information of a taking lens 415 and with correction gain information shown in FIG. 12 from a storage circuit (ROM) 423 connected to the control unit 404', these sets of the information being used for various controls to be later described.

With the structure described above, in accordance with hand vibrations or external vibrations detected with the angular velocity detector 401, the optical vibration correction apparatus 410 is controlled to displace the optical axis and optically compensate for the vibration. A light flux displaced by the optical vibration correction apparatus 410 is focussed via the taking lens 415 upon an image pickup plane of an image pickup element 416, processed by a camera signal processing circuit 417, and recorded in a recording apparatus 418 such as a VTR.

In the NTSC system, a motion vector is detected at a field period, i.e., at a period of 1/60 second. The angular velocity detected with the angular velocity detection circuit 419 is the motion components of the image signal after the vibration thereof was optically corrected, and so it indicates an error (correction remainder) of the vibration correction designated by the angular velocity detector 401. This error signal is normalized as the motion vector amount on the image pickup plane and input to the control circuit 404' in which the signal processing circuit 430 characteristic to this embodiment processes the input error signal in the manner to be described later and input to an adder 412 via a D/A converter 421. With the circuit arrangement described above, a motion vector signal is input to the closed loop circuit including the image correction circuit 410, as auxiliary information representative of the correction remainder of optical vibration correction, for the vibration correction operation.

Figure 11:
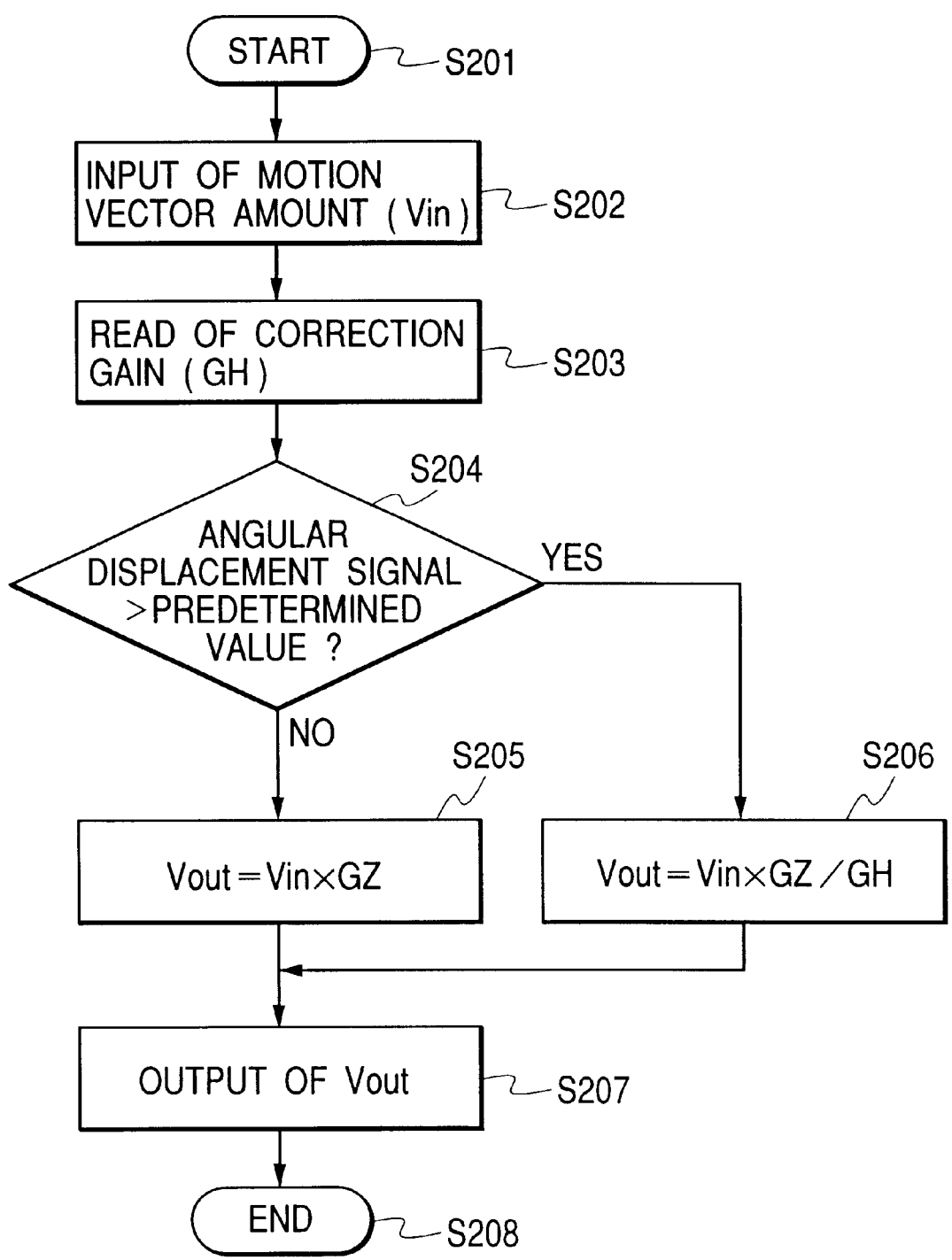
FIG. 11 is a flow chart illustrating an operation of a signal processing circuit.

Next, the processes to be executed by the signal processing circuit 430 characteristic to the invention will be described with reference to the flow chart shown in FIG. 11.

S201: After the power is turned on, the signal processing circuit 430 repetitively executes necessary processes at predetermined timings.

S202: An image motion vector amount detected by the motion vector detection circuit is set to a variable Vin indicating the motion vector. As described previously, the motion vector amount Vin corresponds to a motion amount of each pixel in the vertical and horizontal directions.

S203: In accordance with a detected position of an unrepresented zoom lens in the lens 415, i.e., in accordance with the focal length information, a vector amount correction gain GZ is read. This vector amount correction gain GZ corresponds to a value for moving the optical vibration correction apparatus to deflect an image by one pixel, and varies with the zoom position (focal length).

Figure 12:
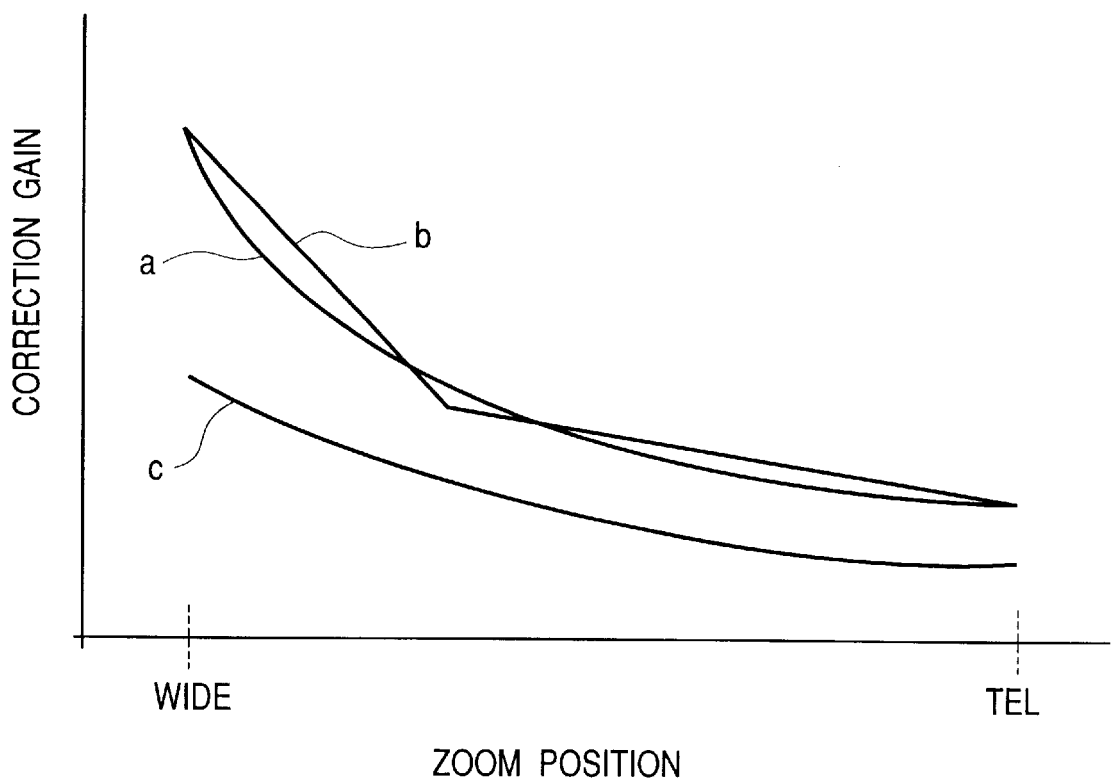
FIG. 12 is a diagram showing the relation between a zoom lens position and a correction gain.

FIG. 12 shows a relation a between the zoom position and the vector amount correction gain GZ. The larger the correction gain, the larger the correction amount. Assuming the same vibration amount, the longer the focal length of the taking lens, i.e., the larger the magnification factor, the larger the motion of the image on the image pickup plane.

In other words, even if the vibration has the same amount, the motion vector derived from an image signal is large on the tele side and small on the wide side. It is therefore necessary to set the correction amount of the vibration correction apparatus small on the tele side and large on the wide side. The correction gain GZ is required to be set large on the wide side and small on the tele side. The curve a shown in FIG. 12 qualitatively indicates such characteristics.

In reading the vector correction amount GZ from the zoom lens position, the vector correction gain GZ for each zoom lens position is stored in advance in a ROM table, and the vector correction gain GZ is read from this table by using the zoom lens position as a search key. Alternatively, the relation between the zoom position and the vector correction gain GZ is approximated to straight lines b to read the gain GZ through calculation.

S204: It is checked whether the angular displacement signal detected with the gyro has a preset value or larger. If it is preset value or larger, it means that the apparatus itself moves greatly in one direction so that the mode is judged as the panning/tilting operation and the flow advances to Step S206, whereas if not, the mode is judged as the ordinary operation and the flow advances to Step S205.

S205: If the mode is judged as the ordinary operation, an amount Vout for moving the optical vibration correction apparatus is calculated from the following equation (2):

$$Vout = Vin \times GZ \tag{2}$$

S206: If the mode is judged as the panning/tilting operation, the amount Vout for moving the optical vibration correction apparatus is calculated from the following equation (3):

$$Vout = Vin \times GZ/GH \quad (3)$$

where GH is a panning/tilting correction amount which is "1" or larger. In the above manner, during the panning/tilting control, the correction gain is suppressed smaller than the ordinary operation so that the control of the apparatus does not follow the panning/tilting operation. The characteristics of this are indicated at a curve c in FIG. 12.

S207: The amount Vout for moving the optical vibration correction apparatus is output.

S208: The procedure is terminated.

As described above, in correcting an image by additionally using the image motion vector amount, the signal processing circuit 430 operates to make the correction operation be performed synchronously with the panning/tilting operation. A natural image can therefore be formed.

In this embodiment, a variable angle prism is used as an example of the optical vibration correction apparatus. Similar advantageous effects can also be expected even when an optical axis is deflected by using a lens group movable in a direction perpendicular to the optical axis of the image pickup optical system.

Also in this embodiment, the signal processing circuit 430 compares the angular displacement signal with a predetermined value and performs a weighing calculation by using two correction gains GZ and GH. A smooth panning/tilting control can also be realized by comparing the angular displacement signal with a plurality of reference values to perform a weighing calculation for a plurality of weighing steps, or by performing a weighing calculation by using the level of the angular velocity signal as a weighing coefficient.

A fifth embodiment of an image pickup apparatus of this invention will be described with reference to FIG. 13. This embodiment is intended to apply the above-described optical vibration correction system to a lens replacement type video camera.

Figure 13:
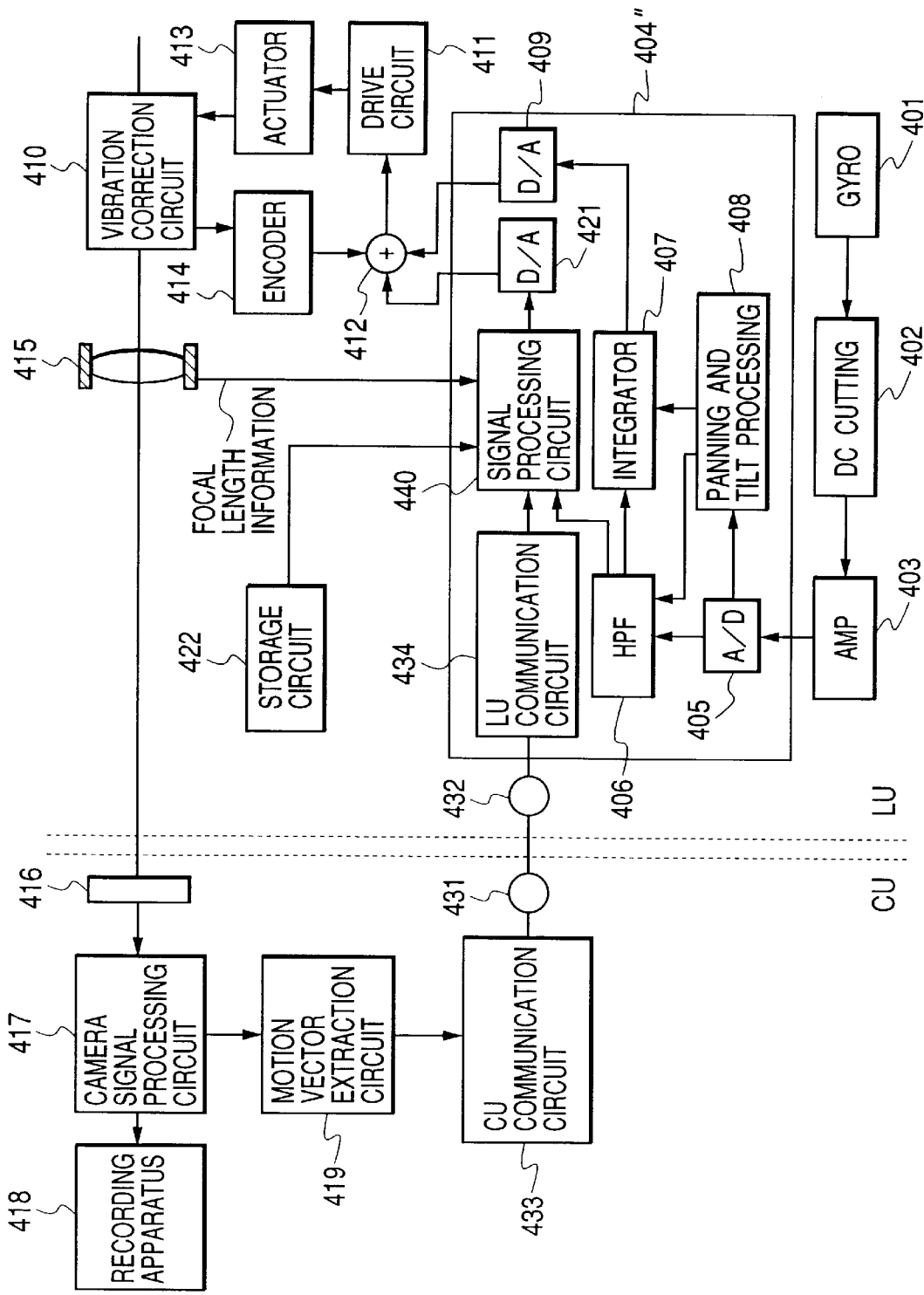
FIG. 13 is a block diagram showing a vibration correction apparatus according to a fifth embodiment of the invention.

In FIG. 13, similar constituent elements to those shown in FIG. 10 are represented by using identical reference numerals, and the detailed description thereof is omitted. A difference from the fourth embodiment is a so-called lens interchangeable system that a camera unit (CU) and a lens unit (LU) can be separated.

A specific example of such a structure is a coupling method called a bayonet mount used with a single lens reflex camera. The angular velocity signal and angular displacement signal are compared with predetermined values, and if they are smaller than the predetermined values, the image pickup apparatus is judged to be fixed and the motion vector is set to "0".

In FIG. 13, reference numerals 431 and 432 represent electrical terminals of CU and LU which are connected when both the units are coupled by an unrepresented bayonet mount.

Similar to the fourth embodiment, an image motion vector derived from the image signal by a motion vector detection circuit 419 is transferred to a control unit 404" via a CU communication circuit 433 and an LU communication circuit at a predetermined timing synchronous with the vertical sync signal of a video signal. These communication circuits may be any circuit which is provided with an electrical data transmission system such as serial data communications, and may be realized by the function of a microcomputer provided in CU and LU.

A motion vector amount transferred from CU to LU is processed by a signal processing circuit 440 of a control circuit 404" and input via a D/A converter 421 to the adder 412. With this structure, a motion vector signal is input to the closed loop circuit including the image correction circuit 410, as vibration correction auxiliary information, for the vibration correction operation.

Figure 14:
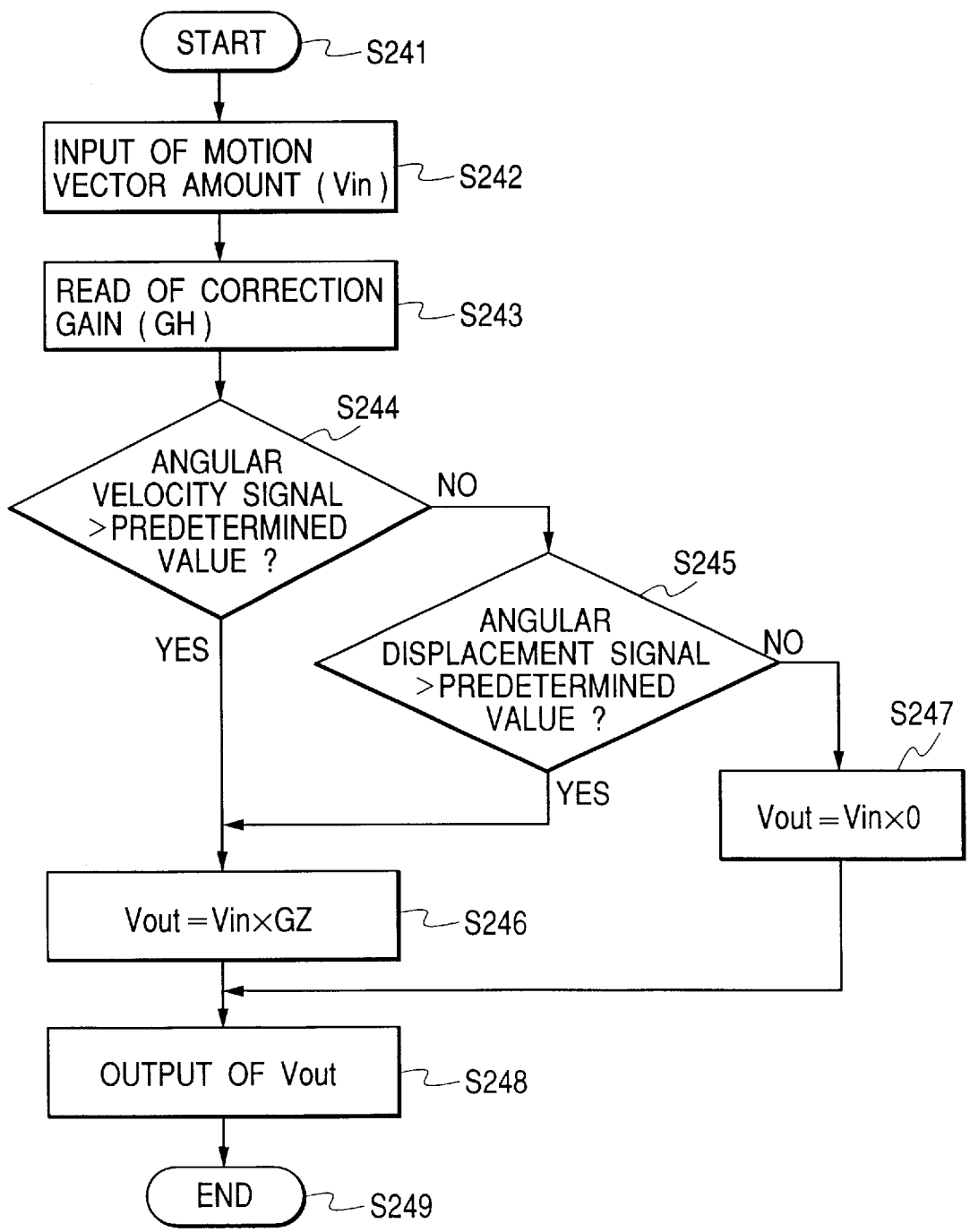
FIG. 14 is a flow chart illustrating an operation of a signal processing circuit.

Next, the processes to be executed by the signal processing circuit 440 of the control circuit 404" characteristic to the invention will be described with reference to the flow chart shown in FIG. 14.

S241: After the power is turned on, the control circuit 404", particularly the signal processing circuit 440, repetitively executes necessary processes at predetermined timings.

S242: An image motion vector amount detected by the motion vector detection circuit is set to a variable Vin indicating the motion vector. As described previously, the motion vector amount Vin corresponds to a motion amount of each pixel in the vertical and horizontal directions.

S243: In accordance with a detected position of an unrepresented zoom lens in the lens 415, i.e., in accordance with the focal length information, a vector amount correction gain GZ is read. This process at Step S243 including reading this vector amount correction gain GZ is the same as the process at Step S203 of the fourth embodiment, and so the detailed description thereof is omitted.

S244: It is checked whether the angular velocity signal has a preset value or larger. If it has the preset value or larger, the mode is judged as the ordinary hand-held photographing and the flow advances to Step S246, whereas if not, the flow advances to Step S245.

S245: It is checked whether the angular displacement signal has a preset value or larger. If it has the preset value or larger, the mode is judged as the ordinary hand-held photographing and the flow advances to Step S246, whereas if not, the mode is judged as a fixed state of the image pickup apparatus and the flow advances to Step S247.

S246: An amount Vout for moving the optical vibration correction apparatus is calculated from the following equation (4):

$$Vout = Vin \times GZ \quad (4)$$

S206: The amount Vout for moving the optical vibration correction apparatus is calculated from the following equation (5):

$$Vout = Vin \times 0 \quad (5)$$

When the image pickup apparatus is fixed, the motion vector Vin is judged as representing a motion of the subject itself even if it is not "0". The vibration detection circuit controls to fix the vibration correction apparatus to the center position, without performing a vibration correction operation.

S248: The amount Vout for moving the optical vibration correction apparatus is output.

S249: The procedure is terminated.

As described above, in the image pickup apparatus of a lens interchangeable type that the camera unit CU and the lens unit LU can be separated, the camera unit CU detects an image motion vector and the lens unit LU corrects the image in accordance with the detected image motion vector. In this case, the signal processing circuit 440 of the control circuit 404" operates to make the correction operation be performed synchronously when the apparatus is fixed, without any control problem even if both the physical detection by the gyro and the motion detection from the image signal are performed. A natural image can therefore be formed.

In this embodiment, a variable angle prism is used as an example of the optical vibration correction apparatus. Similar advantageous effects can also be expected even when an optical axis is deflected by using a lens group movable in a direction perpendicular to the optical axis of the image pickup optical system.

Also in this embodiment, the signal processing circuit 440 of the control circuit 404" performs a weighing calculation. Similar advantageous effects can also be expected by notifying CU of the judgement from the angular velocity signal from the gyro and the angular displacement signal that the image pickup apparatus is fixed, over the signal transmission system, and by setting the derived motion vector to "0".

As described above, in correcting a vibration of an image by using both the vibration amount detected with the angular velocity sensor and the image motion vector, the panning/tilting operation and the camera fixed state are discriminated in accordance with the vibration amount detected with the angular velocity sensor so that the motion correction can be performed synchronously with the panning/tilting operation and the camera fixed operation and a natural image can be formed. The features of the vibration amount detection circuit using the angular velocity sensor and the image motion vector detection circuit can be utilized sufficiently so that a system can be realized which is very excellent in vibration correction, reliability, and stability.

Next, a sixth embodiment of the invention will be described sequentially starting from its background art.

This embodiment provides a vibration correction apparatus which is stable and highly precise, capable of removing unstable factors of a feedback loop system to be caused by a correction delay of the motion correction system and taking into consideration the lens interchangeable system.

Figure 15:
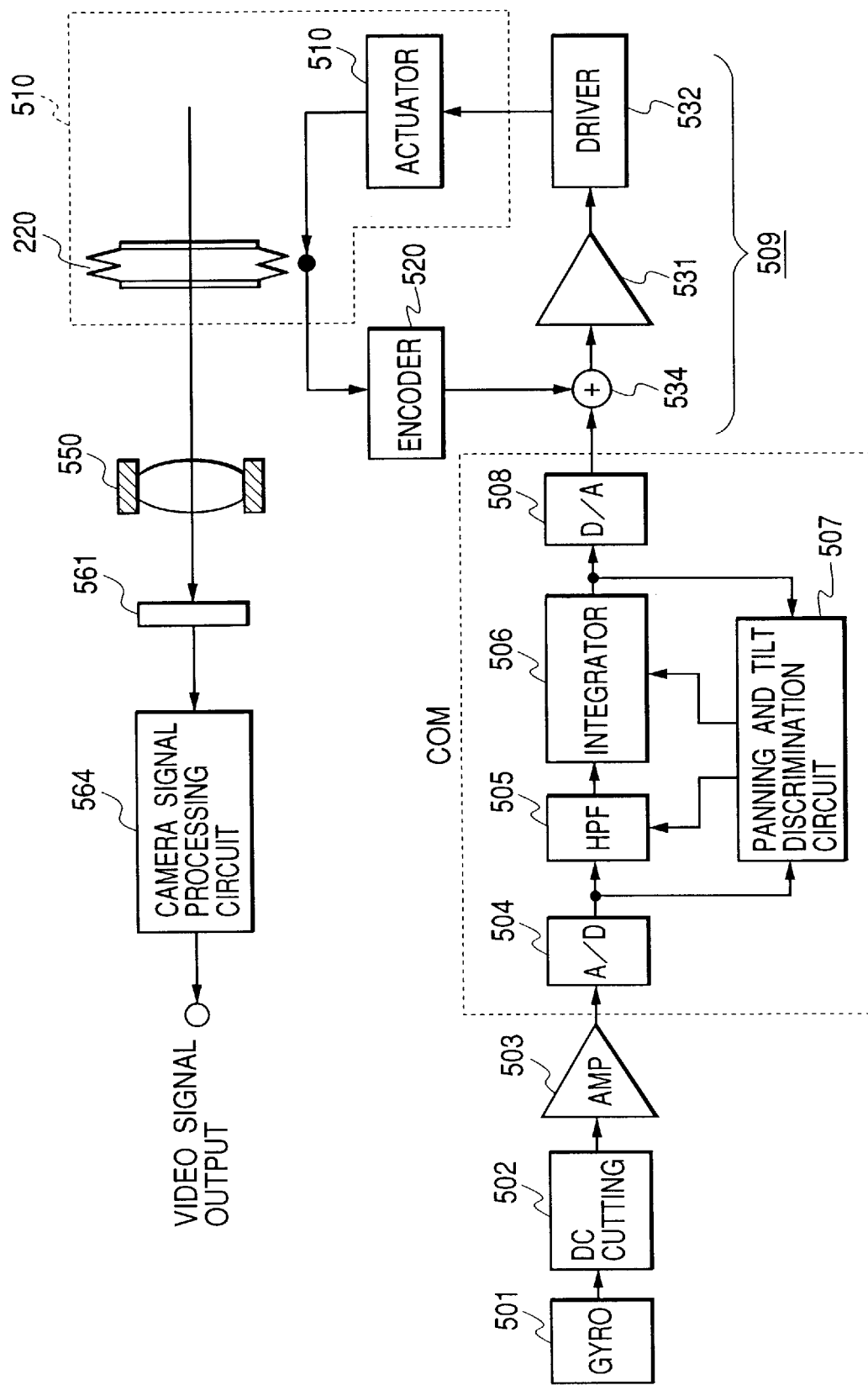
FIG. 15 is a block diagram showing a vibration correction apparatus proposed before this application.

FIG. 15 is a diagram showing the fundamental structure of an image pickup apparatus with a vibration correction apparatus. In FIG. 15, reference numeral 501 represents an angular velocity detector made of an angular velocity sensor such as a gyro sensor, the detector being mounted on the vibration correction apparatus. Reference numeral 502 represents a DC cut filter for cutting the DC components of an angular velocity signal output from the angular velocity detector 501 and passing only the alternating current components or vibration components. This DC cut filter may be a high pass filter (HPF) for cutting a signal of a predetermined band.

Reference numeral 503 represents an amplifier for amplifying the angular velocity signal output from the DC cut filter 502 to a proper level. Reference numeral 504 represents an A/D converter for converting the amplified angular velocity signal from the amplifier 503 into a digital signal. Reference numeral 505 represents a high pass filter (HPF) for cutting the low frequency vibration components of the digital signal converted by the A/D converter 504, HPF having a function of varying the characteristics in an optional band. Reference numeral 506 represents an integration circuit for integrating an output (angular velocity signal) of HPF 505 and outputting an angular displacement signal, the integration circuit having a function of changing its characteristics in an optional band. Reference numeral 507 represents a panning/tilting discrimination circuit for judging from the angular velocity signal and angular displacement signal output whether an operation mode is a panning/tilting operation. The panning/tilting discrimination circuit 507 controls a panning/tilting operation in accordance with the levels of the angular velocity signal and angular displacement signal. Reference numeral 508 represents a D/A converter for converting an angular velocity signal into an analog signal. The A/D converter 504, HPF 505, panning/tilting discrimination circuit 507 and D/A converter 508 may be made of a microcomputer (COM). Reference numeral 509 represents a drive circuit for driving an image correction apparatus 510 at the succeeding stage so as to suppress a vibration, in accordance with the displacement signal output from the microcomputer COM. The image correction apparatus 510 includes an optical vibration correction apparatus 220 for compensating for a vibration by shifting an optical axis thereof.

The operation of the panning/tilting discrimination circuit 507 will be detailed.

The panning/tilting discrimination circuit 507 receives the angular velocity signal from the A/D converter and the angular displacement signal from the integration circuit 505. Even if the angular velocity is a predetermined threshold value or faster, or is slower than the predetermined threshold value, if the angular displacement signal integrated from the angular velocity signal takes a predetermined threshold value, then it is judged that the operation mode is a panning/tilting operation. In this case, the cut-off frequency of HPF 505 is shifted to the high frequency side to make the vibration correction system not respond to the low frequencies. If the panning/tilting operation is confirmed, the time constant of the integration circuit 506 is shortened to control (hereinafter called panning control) the value stored in the integration circuit to have a reference value (a value which takes while a vibration is not detected), to thereby allow the correction position of the image correction apparatus to gradually move to the center of the motion range thereof.

During the panning control, the angular velocity signal and angular displacement signal are being detected. After the panning/tilting, the cut-off frequency is lowered to expand the vibration correction range and the panning control is terminated.

Figure 16:
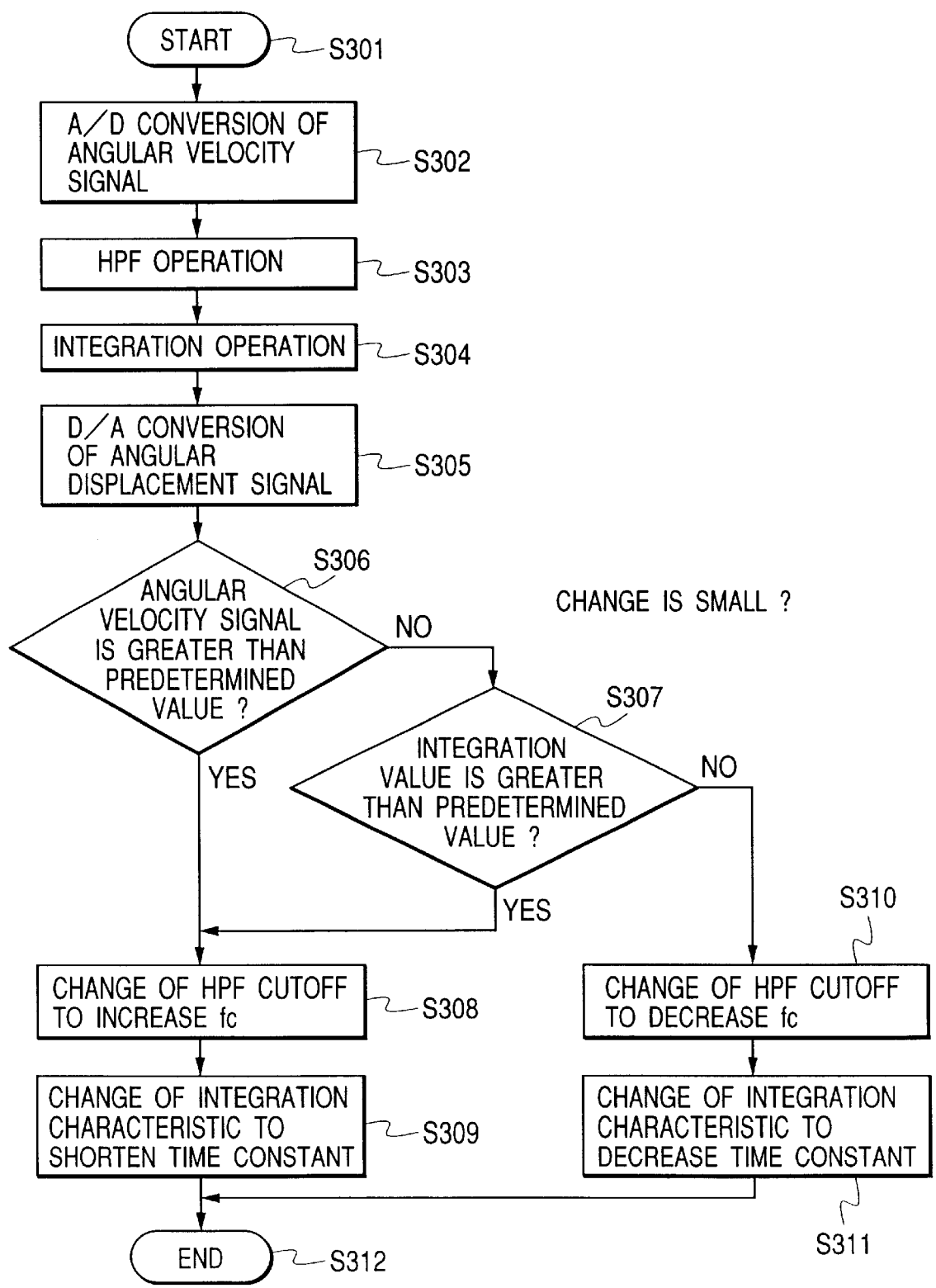
FIG. 16 is a flow chart illustrating a panning control of the vibration correction apparatus.

The panning control operation will be described with reference to the flow chart of FIG. 16.

S301: The start of this flow chart, the processes being repetitively performed at predetermined timings.

S302: The amplified angular velocity signal is converted from the analog signal to a digital signal to be processed by the microcomputer.

S303: An HPF operation is performed using the previous cut-off frequency (fc).

S304: An integration operation is performed using the previous time constant.

S305: A D/A conversion is performed to convert the integrated result, i.e., angular displacement signal into an analog signal.

S306: It is judged whether the angular velocity signal is a predetermined threshold value or larger.

S307: It is judged whether the integrated value is a predetermined threshold value or larger.

If the angular velocity signal is the predetermined threshold value or larger, or if the integrated value is the predetermined threshold value or larger even if the angular velocity signal is smaller than the predetermined threshold value, it is judged that the operation mode is the panning/tilting operation, and the flow advances to Step S308. If both the angular velocity signal and integrated value are smaller than the predetermined threshold values, it is judged that the operation mode is the ordinary operation or a completion state of the panning/tilting operation, and the flow advances to Step S310.

S308: The cut-off frequency of HPF is raised by a predetermined value from the current value to thereby increase the attenuation degree of low frequency signals more than the current attenuation degree.

S309: The time constant of the integration operation is shortened by a predetermined value from the current value to thereby make the angular displacement near the reference value.

S310: The cut-off frequency of HPF is lowered by a predetermined value from the current value to thereby reduce the attenuation degree of low frequency signals more than the current attenuation degree.

S311: The time constant of the integration operation is prolonged by a predetermined value from the current value to thereby enhance the integration effects.

S312: End of the operations.

Figure 17A:
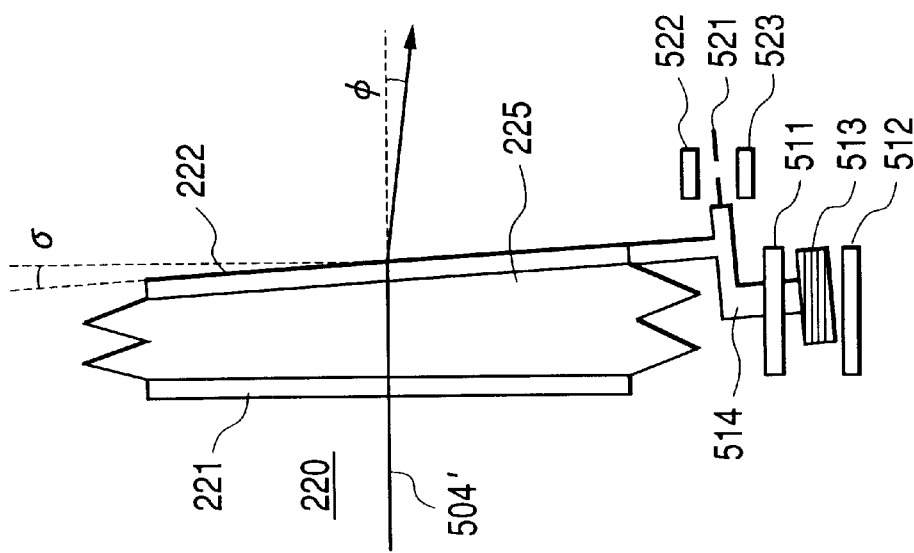
FIGS. 17A and 17B are diagrams illustrating the structure and operation of a variable angle prism.
Figure 17B:
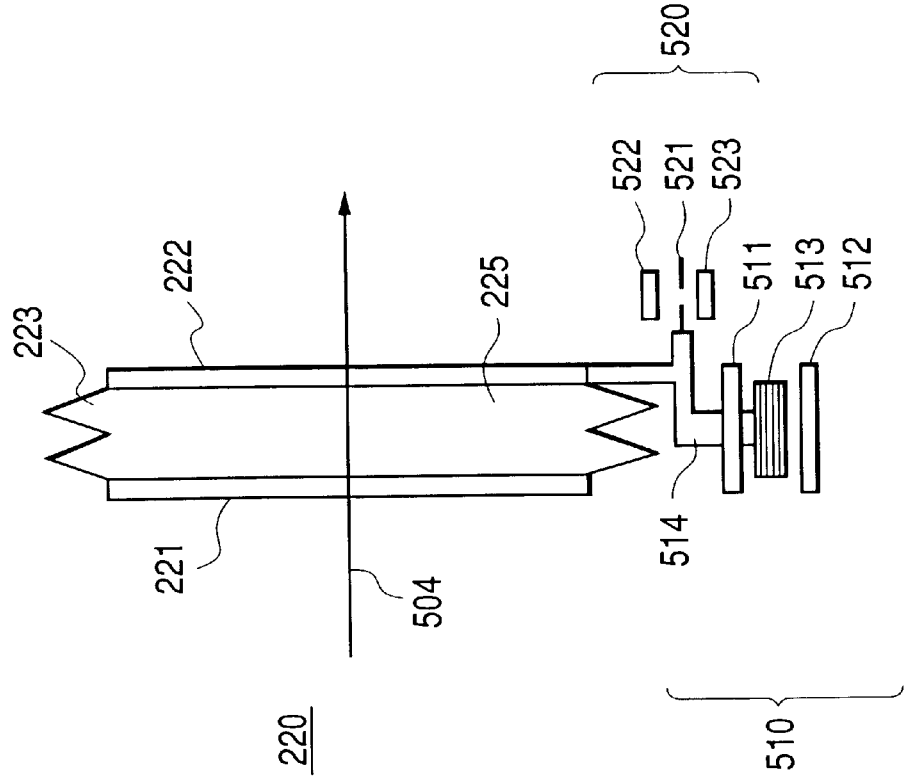

FIGS. 17A and 17B show the structure of VAP as the image correction apparatus. In FIGS. 17A and 17B, like elements to those shown in FIG. 2 are represented by using identical reference numerals, and the description thereof is omitted.

In FIGS. 17A and 17B, the drive system for VAP 220 uses a voice coil 510, and an angular displacement is detected with an encoder 520 and fed back to the drive system to form a closed loop for controlling a drive amount.

Reference numeral 540 represents a path of light which is perpendicularly incident upon a glass plate 221 and passes through high refractive index liquid 225 and through another glass plate 222.

FIG. 17A shows the two glass plates 221 and 222 disposed in parallel. In this state, an optical path 504 enters the glass plate 221 perpendicularly, passes through the high refractive index liquid 225, and emits out of the glass plate 222 perpendicularly.

FIG. 17B shows the glass plate 222 inclined by the voice coil driver, with the optical axis being deflected.

In this state, the glass plates 221 and 222 and the high refractive index liquid 225 constitute an optical prism. Therefore, light perpendicularly incident upon the glass plate 221 propagates from the glass plate 222 along a changed light path 540'.

In FIG. 17B, consider the case the glass plate 222 of VAP 220 is inclined by an angle σ relative to the glass plate 221. The light flux 540' incident upon the glass plate 221 propagates from the glass plate 222 by a deflected angle φ=(n−1)σs, from the same principle of a wedge type prism. Namely, the optical axis 540' is deflected by this angle φ.

The method of correcting the optical axis when VAP is used will be described with reference to FIG. 18.

In FIG. 18, the glass plate 222 takes positions 222-A and 222-B, reference numerals 540 and 540' represent the optical paths, reference numeral 550 represents an image pickup system, reference numeral 561 represents an image pickup element for photoelectrically converting focused light into an electrical signal. Reference numeral 564 represents a signal processing circuit for converting the electrical signal, for example, into a video signal of NTSC or the like, and reference numeral 513 represents a recording apparatus for recording video signals.

When the glass plate 222 takes the position 222-A in parallel to the glass plate 221, the optical path 540' is straight to the image pickup plane. When the glass plate takes the inclined position 222-B, the optical path 540' changes so that a motion of a subject to be caused by a vibration of the image pickup apparatus can be optically corrected.

Returning back to FIGS. 17A and 17B, the actuator 510 will be described. Reference numeral 511 represents a yoke, reference numeral 512 represents a magnet, reference numeral 513 represents a coil, and reference numeral 514 represents an arm for transmitting a drive torque. As current flows through the coil 513 of the actuator 510, an apex of VAP 220 can be changed.

The encoder 520 detects an inclination of VAP. Reference numeral 521 represents a slit for detecting an angle shift of VAP, the slit changing its position while being rotated by the arm 514 together with the glass plate 222 of VAP 220. Reference numeral 522 represents a light emitting diode for detecting the position of the slit 521. Reference numeral 523 represents a position sensing detector (PSD) for detecting a displacement of the slit 521 by using the light emitting diode 522. In this manner, the encoder for detecting an angle shift of VAP is formed.

A light flux with its incident angle being changed by VAP 220 is focused via the taking lens shown in FIG. 18 onto the image pickup plane of the image pickup element 561, converted into an electrical signal, and processed and stored in the recording apparatus 563.

Although not shown in FIGS. 17A and 17B and 18 for the simplicity of drawings, another set of a driver system, an encoder and a control system having the same function as above is mounted perpendicularly to the drive direction of VAP to thereby correct the optical axes in both the up/down and right/left directions.

Next, the fundamental structure and operation of the control circuit for controlling VAP will be described with reference to the block diagram shown in FIG. 19.

Figure 19:
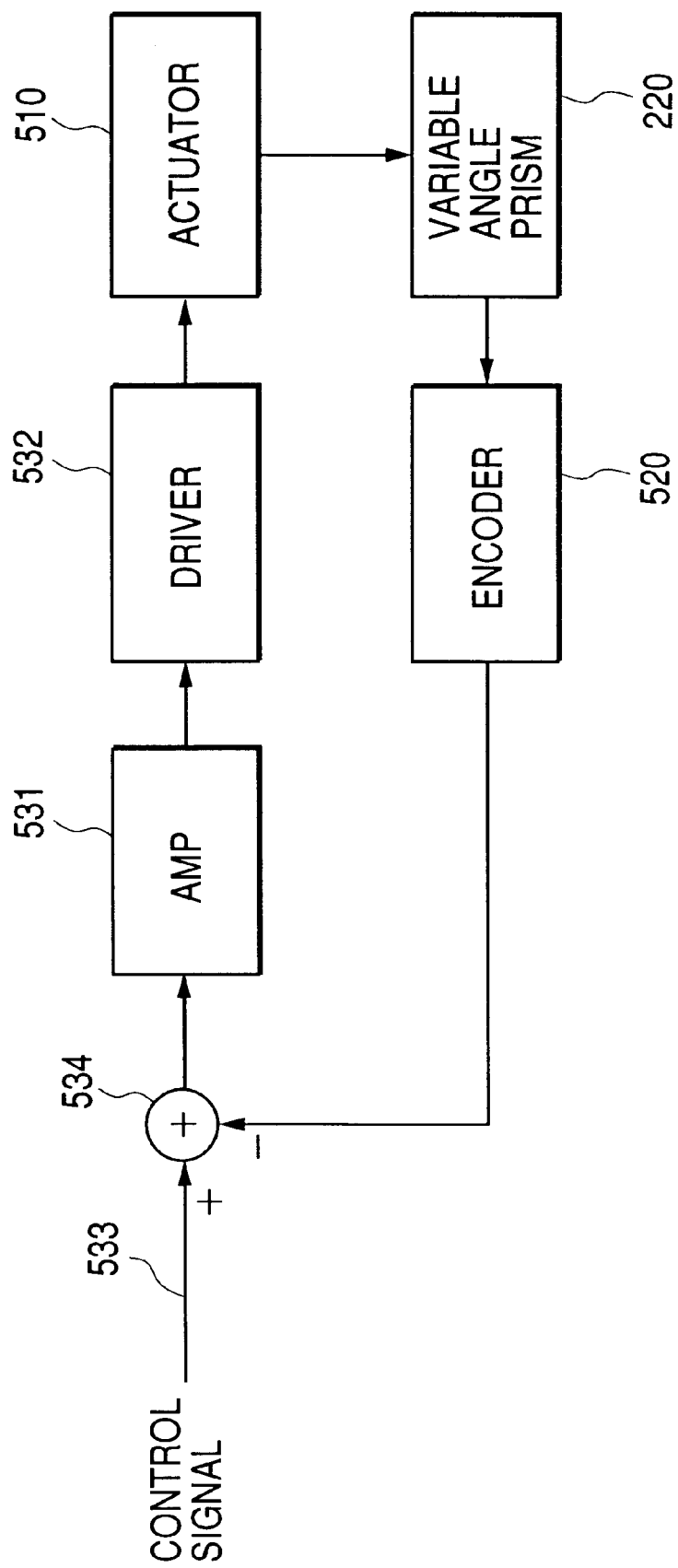
FIG. 19 is a diagram illustrating the structure and operation of the variable angle prism.

In FIG. 19, reference numeral 220 represents VAP, reference numeral 531 represents an amplifier, and reference numeral 532 represents a driver for driving a voice coil type actuator 510 which drives VAP. Reference numeral 520 represents an encoder for detecting an apex angle displacement of VAP. Reference numeral 534 represents an adder for adding a vibration correction control signal 533 output from the microcomputer COM to an inverted output signal of the encoder 520. Since the control system operates in such a manner that the vibration correction control signal 533 output from the microcomputer COM becomes equal to the output signal of the encoder 520, VAP 220 is driven to make the control signal 533 equal to the output of the encoder 520. Therefore, VAP is controlled to take the position (apex angle) designated by the microcomputer COM.

As described above, in accordance with the information detected by the angular velocity detector, a vibration of the camera is detected. A vibration correction signal is obtained through signal processing, and hand vibrations are corrected by the optical vibration correction apparatus.

As a video camera is made compact nowadays, instead of using an angular velocity sensor, an image motion vector detection circuit for detecting vibrations of the camera in accordance with image information has been proposed. Since the image motion vector detection circuit can be implemented on an IC chip, it can be made compact.

With this structure, it can be said that a video camera using the image motion vector detection circuit in place of the angular velocity sensor can be realized.

Another proposal is to realize a system using both the angular velocity sensor and the image motion vector detection circuit.

If there is an error between an actual vibration of a camera and a signal detected with a gyro sensor, a vibration correction has an error. This correction error is emphasized on the image pickup plane as the lens magnification factor becomes large (toward a tele mode), and may cause the poor image quality. In order to reduce this correction error, a correction error is detected with the image motion vector detection circuit, and this correction error is used as a correction signal by the optical vibration correction apparatus to reduce the correction error.

The correction error of a picked-up image is either a correction remainder of the vibration correction system of an image pickup apparatus, or an excessive correction. The longer the focal length of an optical system and the larger the magnification factor, the larger the correction error amount on the image pickup plane of the image pickup apparatus. A lens interchangeable type video camera has been proposed in order to expand the photographing range, similar to a silver salt type camera.

Since the lens interchangeable system can detachably mount an apparatus such as a high magnification lens and an extender, any desired high magnification lens can be used so that the correction error may become larger than a camera-lens integrated type video camera.

The above-described vibration correction system is, however, associated with some problems.

First, in detecting a vibration of a camera with an image motion vector detection circuit, a motion of a representative point on an image compared with that on an image preceding by more than one field (or one frame) is used as a motion of the camera. However, calculation of this image motion vector takes at least one field time delay to be caused by an image storage time, an image read time, an image matching time and the like.

This time delay constitutes a feedback loop via the optical vibration compensation apparatus. Therefore, the loop may become unstable and at the worst it oscillates, depending upon the time delay and the control frequency.

Second, as in the case of the lens interchangeable system, if the motion vector detection circuit on the image pickup element side is coupled via electrical communications means to an optical vibration correction apparatus on the lens side, the correction signal is required to be converted into a transmission signal of a predetermined format, transmitted, and converted again into the correction signal, respectively in the camera unit and lens unit. Therefore, this may become a significant factor of increasing the number of factors generating a delay time in the feedback loop.

In order to suppress the oscillation state, some measures have been studied such as inserting a low pass filter matching a margin of oscillation in the correction system. However, if a low pass filter of a small number of stages is simply inserted, the phase characteristics of the low pass filter may cause a delay in the correction system. If a low pass filter of a large number of stages is used, the structure becomes complicated. A filter realized by software may prolong a process time.

For example, if an image format of NTSC or the like is assumed, vector information is derived from the image signal at an interval of 1/60 second. This time interval becomes sampling timings. Therefore, if filtering by a large number of states is performed, a time delay by the filtering becomes conspicuous and the control system becomes inoperative.

Still further, if a lens interchangeable system capable of separating the camera unit and lens unit is used, a communications time delay between the camera unit and lens unit becomes not negligible.

Although a system mounting a plurality type of motion detection sensors has been proposed, an issue still remains as to how the panning/tilting control described above is established.

In order to solve these problems, the sixth embodiment discloses an image pickup apparatus which comprises: a motion detecting circuit for detecting motion information of an image from a plurality of consecutive images on a image pickup plane; an optical vibration correction apparatus for optically correcting a motion of the image in accordance with a vibration amount; a motion signal processing circuit for controlling a level of an output signal corresponding to the motion information detected by the motion detecting circuit in accordance with a detected motion amount, and outputting the level controlled motion information; and a control target value generating circuit for calculating a control target value of the optical vibration correcting apparatus in accordance with the level controlled motion information output from the motion signal processing circuit.

The embodiment also discloses the configuration of the image pickup apparatus suitable for the application to a lens interchangeable system.

Also in this embodiment, the motion correction control in a hybrid system is optimized, the hybrid system incorporating both a method of detecting a motion vector from an image signal and a method of physically detecting a motion vector, for example, with a gyro sensor.

The sixth embodiment of the image pickup apparatus of the invention will be detailed hereinunder.

Figure 20:
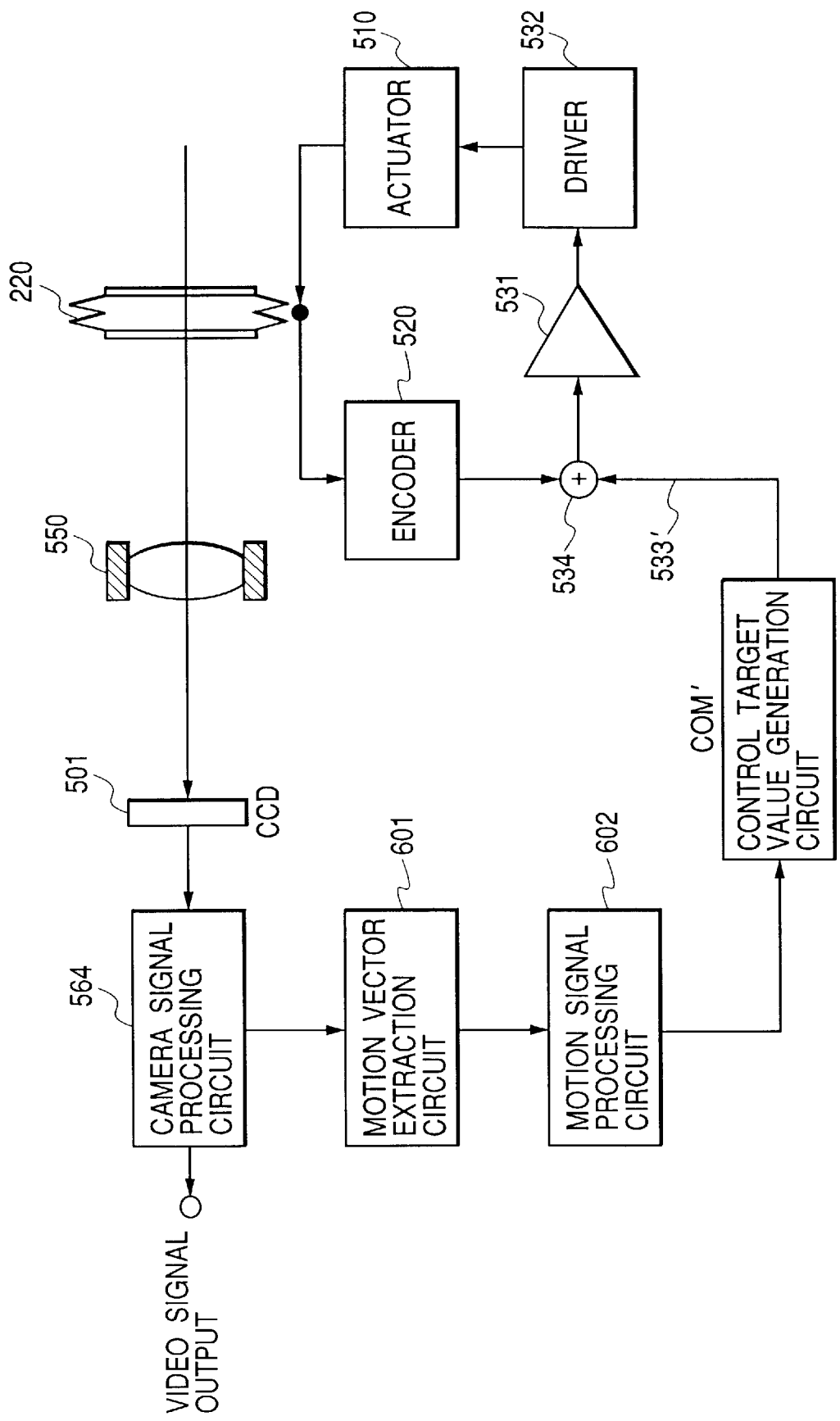
FIG. 20 is a block diagram showing a vibration correction apparatus according to a sixth embodiment of the invention.

FIG. 20 is a block diagram showing the fundamental structure of the vibration correction system of the image pickup apparatus of this invention.

In FIG. 20, like constituent elements to those shown in FIG. 15 are represented by using identical reference numerals, and the detailed description thereof is omitted.

In FIG. 20, like constituent elements to those shown in FIG. 15 are represented by using identical reference numerals, and the detailed description thereof is omitted. In FIG. 20, a motion vector extraction circuit 601 extracts a motion vector of an image on the image pickup plane from an image signal output from an image pickup element 501 such as a CCD. A motion signal processing circuit 602 derives only motion components in a predetermined frequency band. A microcomputer COM' as a control circuit calculates a correction target value, i.e., a control target value 533' which is supplied to an adder 134 to drive VAP 220.

An apex angle displacement of VAP 220 detected with an encoder 520 is also supplied to the adder 534. A difference between the control target value 533' and the apex angle displacement is amplified by an amplifier 531. The amplified difference is supplied to a driver 532 which drives an actuator 510 to change the apex angle of VAP 220. This feedback loop operates to drive VAP 220 in such a manner that the control target value 533' becomes equal to an output of the encoder 534.

The motion vector extraction circuit 601 will be described in detail.

As a method of detecting a motion vector necessary for an image coding apparatus and an image vibration detection apparatus, a correlation method and a block matching method are presently known.

A matching operation itself is detailed, for example, in "Information Processing" by Morio Ogami et al., Vol. 17, No. 7, at pp. 634 to 640, July 1976. With a block matching method, an input image signal is divided into a plurality of blocks having a proper size (e.g., 8×8 pixels), differences between pixels in the divided block and pixels in a predetermined range of a previous field (or frame), are calculated in the unit of block. A block in the previous field (or frame), having a minimum sum of absolute values of the differences, is searched. A relative displacement of this block corresponds to a motion vector of the block.

An example of the block matching method will be described with reference to FIG. 21 which is a block diagram illustrating the processes to be executed by the motion vector extraction circuit 601.

Figure 21:
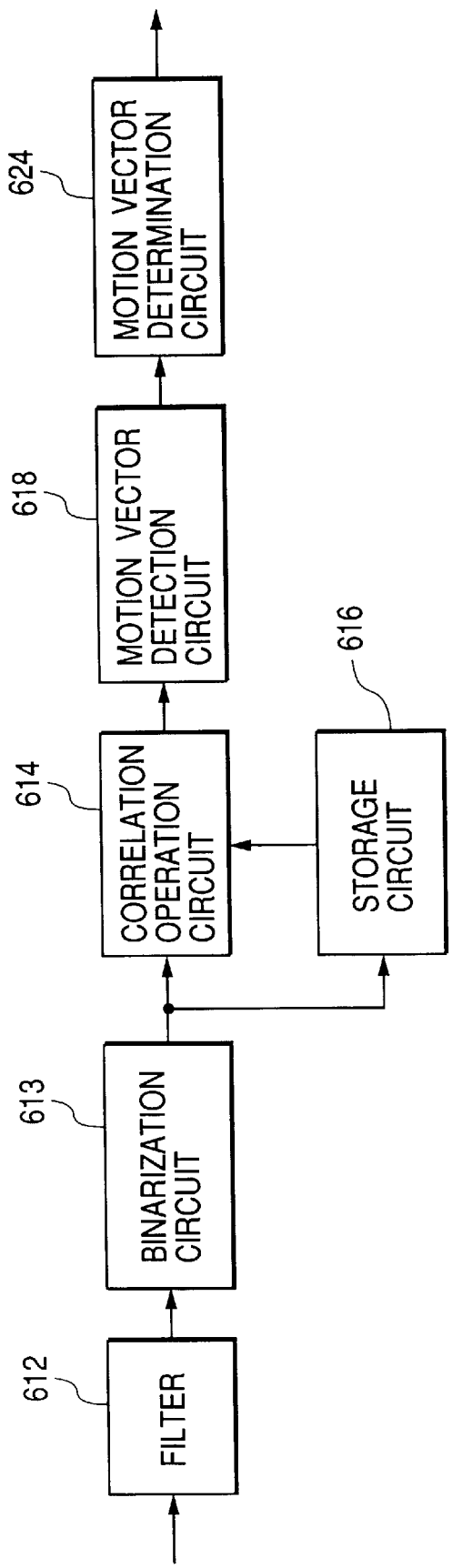
FIG. 21 is a block diagram showing a motion vector detection circuit of the sixth embodiment of the invention.

In FIG. 21, an image signal from which a motion vector is detected is supplied to a spatial frequency filter 612. The filter 612 is used for extracting spatial frequency components effective for detecting a motion vector from the image signal, the filter 612 removing the high spatial frequency components of the image signal.

The image signal passed through the filter 612 is binarized by a binarization circuit 613 relative to a predetermined level of the image signal. The binarized image signal is supplied to a correlation operation circuit 614 and to a storage circuit 616 serving as a one-field period delay circuit. The correlation operation circuit 614 is also supplied with the image signal one field before from the memory circuit 616. The correlation operation circuit 614 performs a correlation operation of a current field and a past field one field before in the unit of block by using the block matching method. The correlation operation result is supplied to a motion vector detection circuit 618 at the next stage. In accordance with the correlation value, the motion vector detection circuit 618 detects a motion vector of each block. Specifically, a block one field before having a minimum correlation value is searched and its relative motion is used as a motion vector.

A motion vector of each block is supplied to a motion vector determination circuit 624. In accordance with the motion vector of each block, the motion vector determination circuit 624 determines a total motion vector. For example, a median or an average of motion vectors of respective blocks is used as the total motion vector.

In the above manner, the motion amounts (motion vectors) in the vertical and horizontal directions can be calculated for each pixel.

This motion vector corresponds to a motion amount of a continuous image per unit time, and is proportional to a motion amount of the continuous image.

An extracted motion vector will be described reverting back to FIG. 20. In this example, a motion vector is extracted from an image signal passed through VAP 220 as the image correction apparatus. Therefore, the extracted motion vector is a "correction remainder of the image per unit time".

In order to obtain a displacement amount or correction target value of VAP 220 as the image correction apparatus from the "correction remainder of the image per unit time", an integration operation is performed a plurality of times.

However, as described earlier, in the feedback control system of this invention for extracting a motion vector from an image and optically correcting the motion amount, the storage time of the image pickup element 561 and the process time of the vector extraction circuit 601 become not negligible. If the hand vibration frequency is corrected by using the format (moving images of 60 fields per second) in conformity with NTSC or the like, an oscillation margin of the feedback loop cannot be retained sufficiently and at the worst, the correction optical system may enter an oscillation state.

In order to solve this problem, the motion signal processing circuit 602 attenuates image signals in the frequency band which may cause oscillation, to thereby provide a sufficient oscillation margin.

Figure 22:
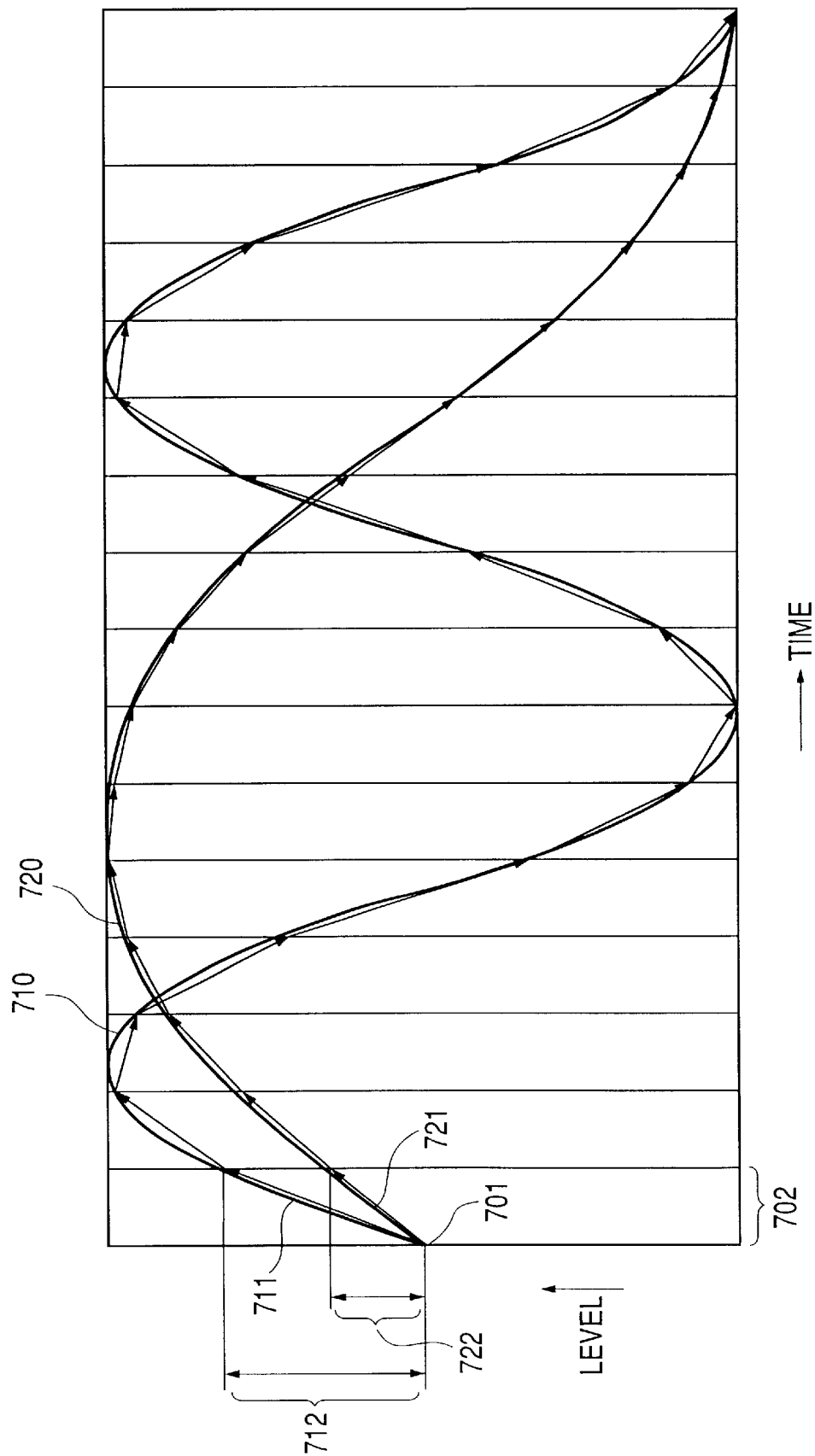
FIG. 22 is a graph illustrating a motion signal processing circuit of the embodiment.

For example, consider waveforms 710 and 720 shown in FIG. 22.

FIG. 22 is drawn assuming that image signals having the same amplitude and different frequencies (710>720) are input to the image pickup system. These waveforms 710 and 720 are sine waves input to the image pickup system. Vectors extracted from such image signals in a unit time are indicated by arrows 711 and 721. In this graph, a pitch between gradations dividing the time axis indicates the unit time. For example, this unit time is 1/60 second if the process is performed at timings in conformity with NTSC.

As seen from this graph, the waveforms 710 and 720 have different vectors per unit time as indicated by the arrows 711 and 721. Although the vector changed depending on the sampling timings, the following relation is generally satisfied:

vector of waveform 710>vector of waveform 720

For example, consider a difference between vectors per one unit time from a timing at an origin 701 to the first sampling point. As compared to a vector 721 of the lower frequency waveform 720, the vector 711 of the higher frequency waveform 710 is larger as indicated at 712 and 722.

From this fact, if the vibration of an image has the same amplitude, a signal having a higher frequency has a larger change amount (motion vector) per unit time, and conversely a signal having a lower frequency has a smaller change amount per unit time.

Figure 23A:
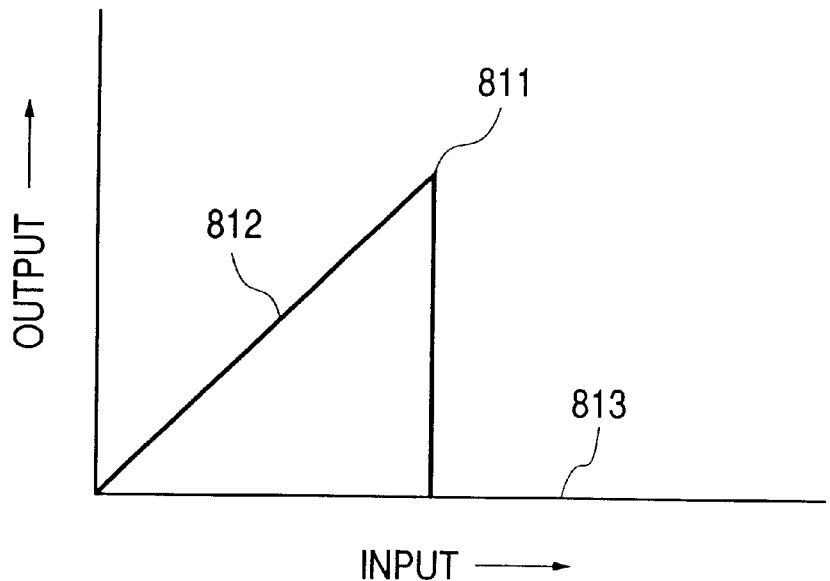
FIGS. 23A and 23B are graphs illustrating the operation of an operation unit of the motion signal processing circuit of the embodiment.
Figure 23B:
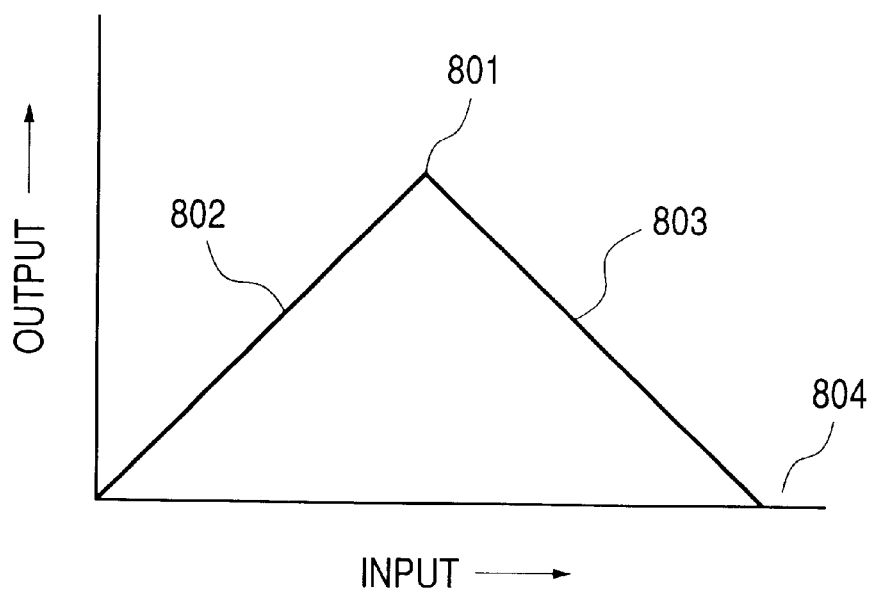

By utilizing this characteristic, an operation unit having the input-output characteristics such as shown in FIG. 23A or 23B is inserted into the feedback control system of this invention which extracts the motion amount from the image signal and optically corrects a vibration, to thereby allow the high frequency components to be removed and a sufficient oscillation margin to be provided.

More specifically, in the case of the operation unit having the input-output characteristics shown in FIG. 23A, until an input signal (motion vector per unit time) exceeds a predetermined level 811, the input signal itself is output to have the input-output characteristics represented by 812. If the input signal exceeds the predetermined level 811, a signal of "0" level is maintained to be output as indicated at 813.

By properly adjusting the point of the input signal at the predetermined level 811, the motion vector typically the motion vector 711 detected from the sine wave 710 shown in FIG. 22 can be set to "0". Therefore, the signals having a predetermined frequency or higher can be attenuated without generating a substantial time delay.

In the case of the operation unit having the input-output characteristics shown in FIG. 23B, until an input signal (motion vector per unit time) exceeds a predetermined level 801, the input signal itself is output to have the input-output characteristics represented by 802. If the input signal exceeds the predetermined level 801, a signal is output in accordance with a negative slope indicated at 803, and if the input signal becomes higher after the signal takes "0" level, a signal of "0" level is maintained to be output as indicated at 804.

Also with this input-output characteristics ensuring a continuity even if the input level of the operation unit with the characteristics shown in FIG. 23A becomes high or low, a signal having a predetermined frequency band can be attenuated similar to FIG. 23A.

In this embodiment, the operation units of two types having the input-output characteristics are shown. However, other operation units having different characteristics may also be used with similar advantageous effects so long as the fundamentals are satisfied, the fundamentals being that an increase of the output is limited or the output is set to "0" only when the input level exceeds a predetermined level.

Figure 24:
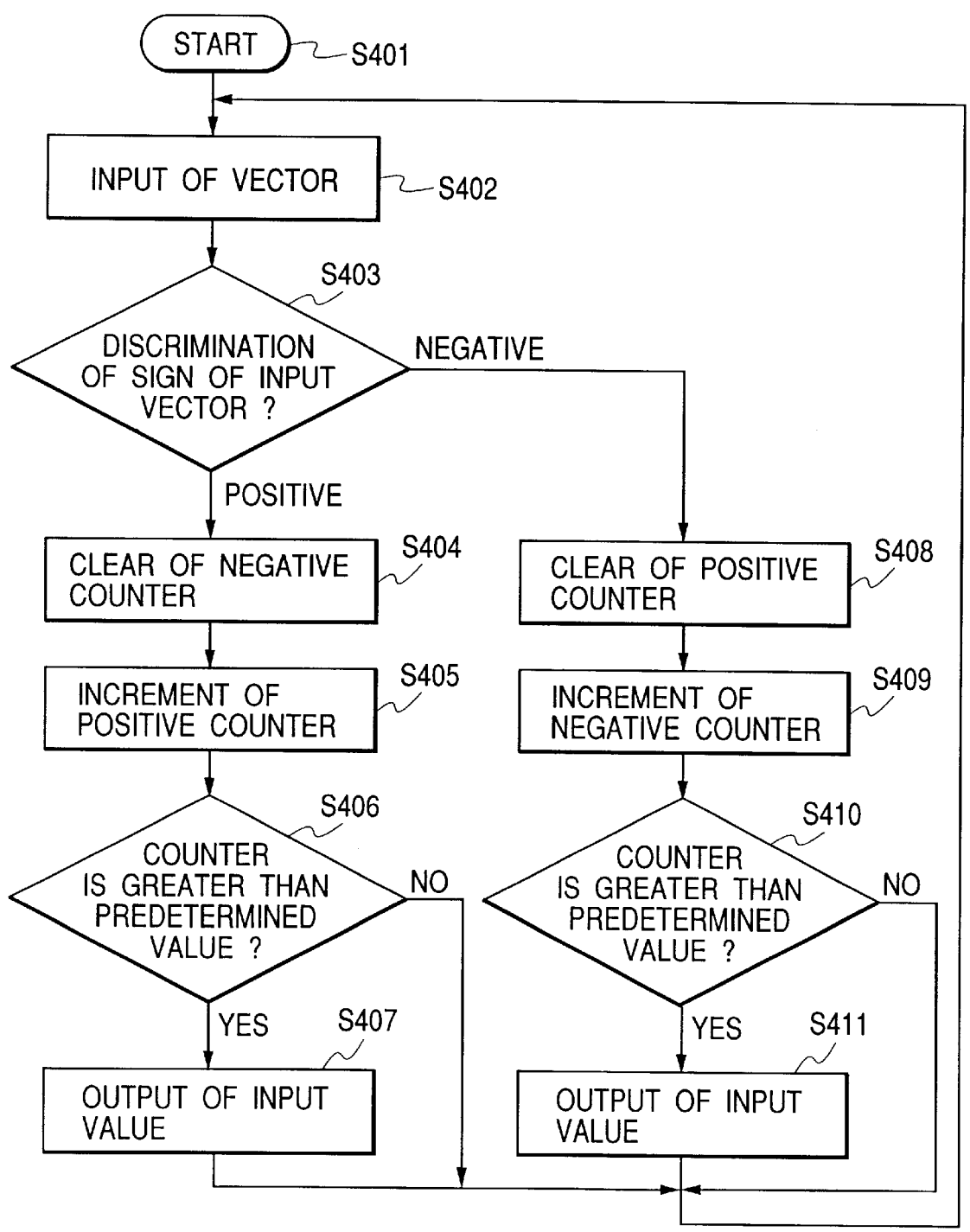
FIG. 24 is a flow chart illustrating the operation of a second operation unit of the motion signal processing circuit of the embodiment.

A second operation unit to be described hereinunder removes the higher frequency components in accordance with the flow chart shown in FIG. 24. This operation unit pays attention to that as shown in the vectors indicated by arrows in FIG. 22, the number of repetitions of positive and negative (increase and decrease) vectors is larger for the high frequency waveform 710 than for the low frequency waveform 720.

In the flow chart shown in FIG. 24, the flow of an input and an output will be traced.

S401: A start of this flow.

S402: An extracted vector is fetched as an input.

S403: A sign of the input vector is checked. If positive, the flow advances to Step S405, whereas if negative, the flow advances to Step S408.

S404: A counter operating when the input vector is negative is cleared.

S405: A counter operating when the input vector is positive is incremented.

S406: If the count counting the positive vector is a predetermined value or larger, the flow advances to Step S407, whereas if not, the flow returns to Step S402.

S407: An input value is output to return to Step S402.

S408: The counter operating when the input vector is positive is cleared.

S409: The counter operating when the input vector is negative is incremented.

S410: If the count counting the positive vector is a predetermined value or larger, the flow advances to Step S411, whereas if not, the flow returns to Step S402.

S411: An input value is output to return to Step S402.

As described above, only when the vector is consecutively detected in the same sign direction a plurality of repetitions, the vector is made effective so that only the vector containing the frequency components lower than a predetermined frequency can be extracted.

The values to be compared with the counts at Steps S406 and S410 may be set depending upon the sampling frequency and the frequency components to be passed.

In this embodiment, an input value is not output if the count reaches the predetermined value or larger. Alternatively, an output value may be gradually attenuated depending upon the conditions of the predetermined number. In this embodiment, immediately after the sign changes, the counter counting the vector of the opposite sign is cleared. Instead, after a sign change repeats a plurality of times, the counter may be cleared depending upon the predetermined value, allowing to set the sampling frequency and the frequency components to be passed.

As described above, the signal processing circuit 602 including the first and second operation units described above processes vectors extracted by the motion vector extraction circuit 601 and performs an operation corresponding to that of the microcomputer COM described previously to drive the optical vibration correction apparatus 220. The microcomputer COM' of this embodiment performs the similar operation to the microcomputer COM shown in FIG. 15 excepting that an integration operation is performed a plurality of times, and the A/D converter is not necessary in some cases.

In this embodiment, although the second operation unit is placed immediately after the first operation unit, the second operation unit may be laid out at any position so long as it is before an unrepresented second stage integrator.

Figure 25:
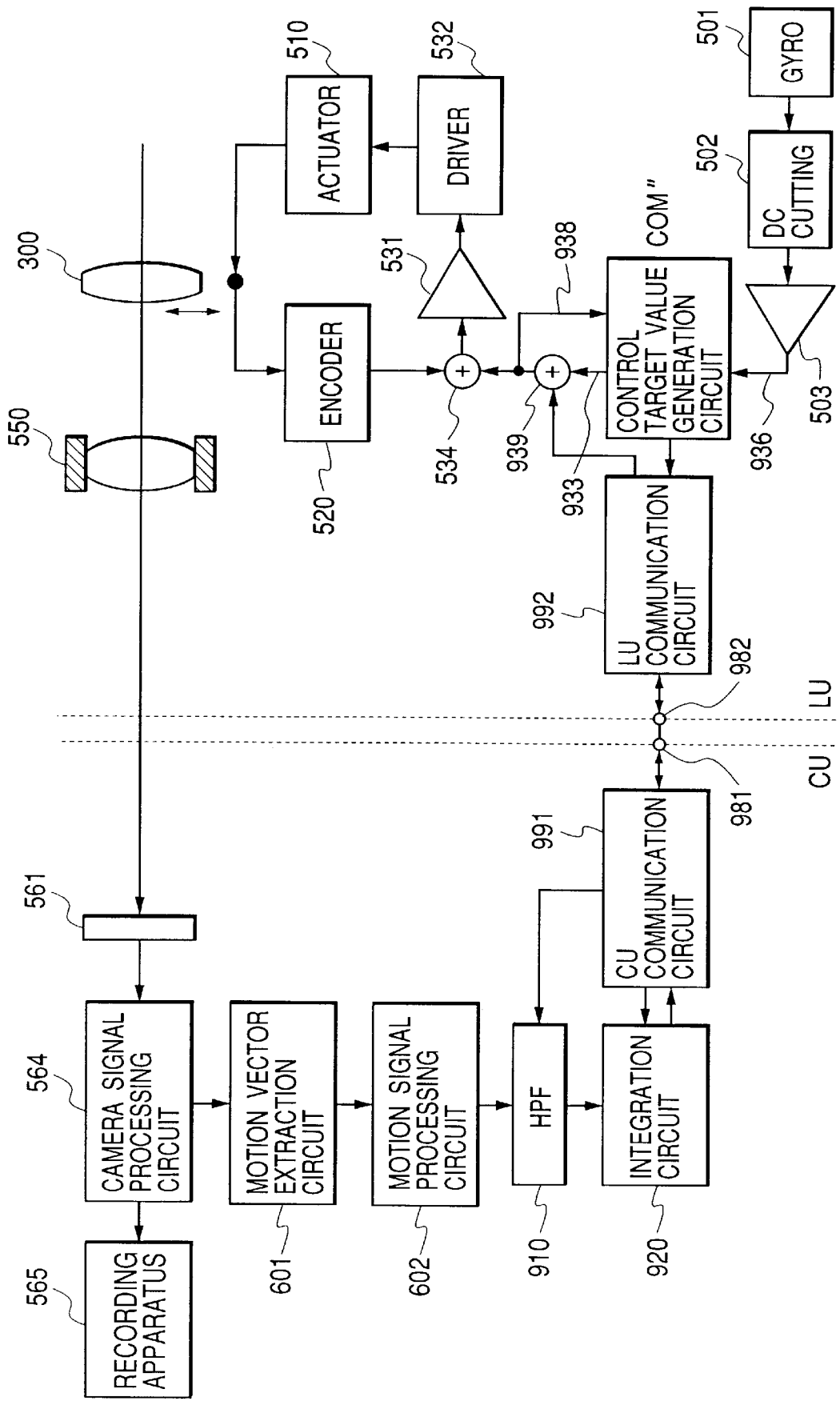
FIG. 25 is a block diagram showing a vibration correction apparatus according to a seventh embodiment of the invention.

A seventh embodiment of this invention is shown in FIG. 25. In this embodiment, the invention is applied to a lens replacement type video camera and the motion vector is detected by additionally using the angular velocity sensor.

In FIG. 25, similar constituent elements to those of the sixth embodiment are represented by using identical reference numerals, and the detailed description thereof is omitted.

In FIG. 25, a difference from the sixth embodiment is the structure that a camera unit (CU) and a lens unit (LU) can be separated in the area indicated by broken lines.

A specific example of such a structure is a coupling method called a bayonet mount used with a single lens reflex camera, a video camera and the like.

Reference numerals 981 and 982 represent electrical terminals of CU and LU which are connected when both the units are coupled by an unrepresented bayonet mount.

Another difference from the sixth embodiment resides in that a motion vector extracted by a motion vector extraction circuit 601 is processed by a motion signal processing circuit to remove signals in an unnecessary frequency band. The resultant signal is added to a motion signal 936 detected with an angular velocity sensor 501 used for correcting hand vibrations.

Constituent elements shown in FIG. 25 will be described sequentially. Light picked up by LU including the image pickup system is focussed onto an image pickup element 561 such as CCD and converted into an image signal which is then supplied to a camera signal processing circuit 564 and stored in a recording apparatus 565. At the same time, a luminance signal obtained by the camera signal processing circuit is supplied to the motion vector extraction circuit 601 which extracts a motion vector, and the motion signal processing circuit 602 selects a signal in a desired frequency band to be supplied to the feedback system.

This signal is supplied to HPF 910 and then to an integration circuit 920 which are provided in COM' in the sixth embodiment, so that the signal is converted into a control target value of the optical correction system. The control target value is transmitted to an LU communication circuit 992 via a CU communication circuit 991.

More specifically, in the integration circuit 920, a vector signal obtained by the motion vector extraction circuit 601 is a correction remainder per unit time, as described previously. It is therefore necessary to perform an integration operation a plurality of times in order to convert it into the optical correction amount. This integration circuit 920 performs such operations.

The control target value received at LU via the LU communication circuit is added by an adder 939 to a vibration correction control signal 933. This addition signal is supplied as a final vibration control signal 938 to the drive circuit to correct the optical axis.

In the seventh embodiment, a lens-shift optical correction system is used as the optical correction system. However, the structure is not so much different from the sixth embodiment, and both the correction systems can properly correct the optical axis.

A microcomputer COM" or control target value generation circuit is slightly different from that shown in FIG. 15 in that a portion of a discrimination signal for panning/tilting is different. The final vibration correction control signal 938 is again A/D converted and supplied to the panning/tilting discrimination circuit 507 in COM" (refer to FIG. 15) to be used for the control of a panning/tilting operation.

The panning/tilting control signal obtained by the panning/tilting discrimination circuit 507 is transmitted via the CU communication circuit 992 to the LU communication circuit 991 in LU. Similar to the operation of HPF 505 and the integration circuit 506 of COM shown in FIG. 15, HPF 910 and the integration circuit 920 are controlled in accordance with the panning/tilting control signal to synchronize the panning/tilting operations in LU and CU.

A signal transmission will be briefly described. A signal is transmitted via the CU and LU communication circuits 991 and 992 at a predetermined timing synchronous with a vertical sync signal of a video signal for example.

This communication may be realized by an electric data transmission scheme, such as serial communications.

In such the scheme, CU and LU are each generally configured by one-chip microcomputer. The vibration correction information is one example of information to be transmitted.

Figure 26:
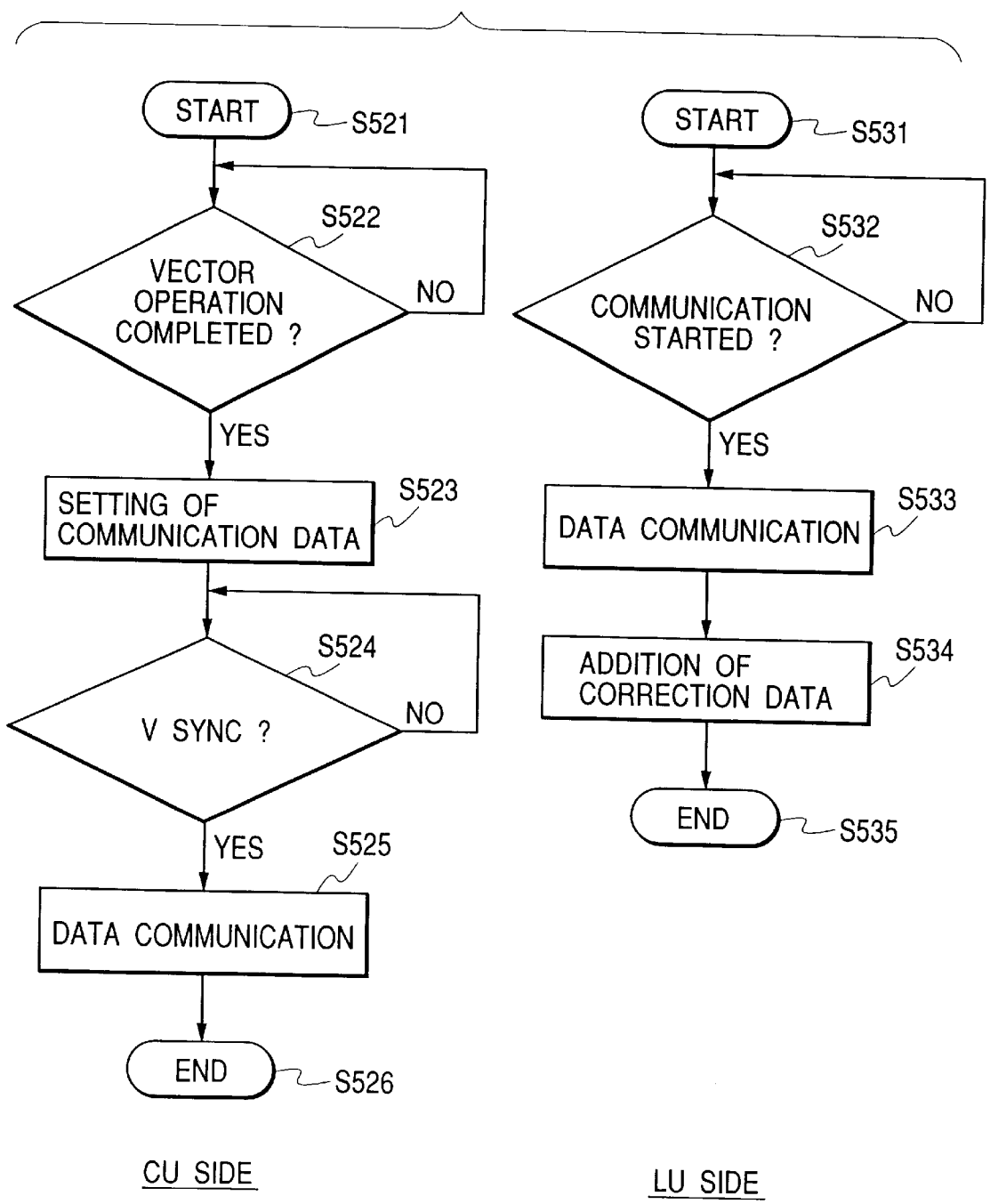
FIG. 26 is a flow chart illustrating communications between CU and LU.

FIG. 26 is a flow chart illustrating a data transmission operation.

In this flow chart, although transmitting from CU to LU the motion vector information as the vibration auxiliary information will be described mainly, in actual, other autofocus (AF) information, auto exposure (AE) information and the like can be transmitted at the same time when the motion vector information is transmitted.

The camera unit (CU) performs the following processes.

S521: A start of this flow chart which is repetitively performed at predetermined timings.

S522: It is confirmed whether motion vector information has been extracted.

If the motion vector information has been extracted, the flow advances to Step S523.

S523: Communication data to LU is set.

S524: It is confirmed whether the vertical sync signal is generated in CU.

If the sync signal is generated, the flow advances to Step S525.

S525: If the vertical sync signal is generated, data communications starts.

S526: The procedure is terminated.

The lens unit (LU) performs the following processes.

S531: A start of this flow chart which is repetitively performed at predetermined timings.

S532: It is confirmed whether a communication start signal is transmitted from CU.

If transmitted, the flow advances to Step S533.

S533: Data communications from CU starts.

S534: Data transmitted from CU is supplied to the adder 534.

S535: The procedure is terminated.

Data is transmitted from CU to LU in accordance with the flow chart described above.

Although not shown, also in this embodiment, similar constituent elements are disposed along the directions perpendicular to the correction axis and optical axis so that correction in the up/down and right/left directions relative to the optical axis becomes possible.

In this embodiment, the angular velocity detection axis of the gyro sensor 501 as the angular velocity detector is perpendicular to the motion vector detection axis, and the adder 534 performs an addition operation relative to each detection axis.

As described so far, according to the above embodiments, of the correction remainder information contained in the image, only the information containing signals lower than the desired frequency band is fed back to the optical vibration correction apparatus. Accordingly, without affecting the phase characteristics of the detected correction remainder information, the problem of oscillation to be caused by a time lag can be solved and hand vibrations can be corrected stably.

Also in the lens interchangeable system capable of separating the camera unit and lens unit, unstable factors of the feedback control to be caused by a time lag in communications can be eliminated.

Furthermore, if an angular velocity sensor is additionally used and the frequency components contained in the correction remainder information are corrected, by a gyro angular velocity detection signal, within the frequency band detectable by the gyro sensor, then the vibration correction signal contains only signals lower than the detection frequency band so that good hand vibration correction becomes possible.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vibration correction apparatus comprising:
   image sensing means for sensing an image and outputting an image signal corresponding to the image;
   detecting means for detecting motion signal information from the image signal;
   signal processing means for producing motion correcting signal information from the motion signal information, the motion correcting signal information having a different period than a period of the motion signal information;
   changing means for changing the period of the motion correcting signal information on the basis of an image sensing operation of said image sensing means; and
   correcting means for correcting a motion of an image on the basis of the motion correcting signal information changed by said changing means.

2. A vibration correction apparatus according to claim 1, wherein a period of the correction operation of said correcting means is shorter than a period of said detecting means.

3. A vibration correction apparatus according to claim 1, further comprising control means for changing a period of a correction operation of said correcting means in accordance with a television system.

4. A vibration correction apparatus according to claim 3, wherein a period of said detecting means and the period of the correction operation of said correcting means are synchronous with V-sync.

5. A vibration correction apparatus according to claim 1, wherein said correcting means is optical vibration correcting means.

6. A vibration correction apparatus according to claim 1, wherein said detecting means is disposed on a camera side and said correcting means is disposed on a lens side.

7. An image pickup apparatus comprising:
   image pickup means for picking up an image of a subject and generating an image signal;
   motion detecting means for detecting a motion of the image from the image signal generated by said image pickup means;
   generating means for generating a correction target value in accordance with a detection result by said motion detecting means;
   correcting means for correcting a motion of the image in accordance with the correction target value generated by said generating means; and
   control means for changing a sampling period of the correction target value generated by said generating means, in accordance with an image pickup operation of said image pickup means.

8. An image pickup apparatus according to claim 7, further comprising:
   vibration detecting means for detecting a vibration of said image pickup means, wherein said generating means generates the correction target value in accordance with detection results by said vibration detecting means and said motion detecting means.

9. An image pickup apparatus according to claim 7, wherein said correcting means optically corrects a vibration of said image pickup means.

10. An image pickup apparatus according to claim 7, wherein a lens unit includes said correcting means, and
   wherein said control means is detachably mounted on the image pickup apparatus.

11. An image pickup apparatus according to claim 7, wherein said motion detecting means detects a motion vector of images between fields or frames.

12. An image pickup apparatus comprising:
   image pickup means for picking up an image of a subject and generating an image signal;
   motion detecting means for detecting a motion vector of images between fields or frames from the image signal obtained by said image pickup means;
   vibration detecting means for detecting a vibration of said image pickup means at a predetermined period different from a period of said motion detecting means;
   correcting means for optically correcting a vibration of the image in accordance with detection results by said vibration detecting means and said motion detecting means;
   generating means for generating a correction target value to be supplied to said correcting means, from a detection result by said motion detecting means; and
   control means for modifying a sampling period of the correction target value by said generating means on the basis of information relating to a television system.

13. An image pickup apparatus according to claim 12, wherein said correcting means includes a variable angle prism for transmitting the image of the subject to said image pickup means, drive means for driving said variable angle prism, and apex angle detecting means for detecting an apex angle of said variable angle prism, and
   wherein said drive means drives said variable angle prism in such a manner that a detection result by said apex angles detecting means becomes equal to the correction target value generated by said generating means.

14. An image pickup apparatus according to claim 12, wherein said vibration detecting means detects a vibration along two perpendicular directions.

15. An image pickup apparatus according to claim 12, wherein said vibration detecting means includes an angular velocity sensor and converting means for converting a detection signal of said angular velocity sensor into an angular displacement signal.

16. An image pickup apparatus according to claim 12, wherein said image pickup means includes a solid state image pickup element.

* * * * *

UNITED STATES PATENT AND TRADEMARK OFFICE
CERTIFICATE OF CORRECTION

PATENT NO.    : 6,734,901 B1
DATED         : May 11, 2004
INVENTOR(S)   : Toshimichi Kudo et al.

It is certified that error appears in the above-identified patent and that said Letters Patent is hereby corrected as shown below:

Column 3,
Line 7, "to" should read -- is to --.

Column 9,
Line 25, "Other" should read -- Another --.

Column 12,
Line 27, "basing" should read -- based --.

Column 24,
Lines 21 to 23, should be deleted.

Column 28,
Line 14, "by" should read -- by an --.
Line 15, "focussed" should read -- focused --.

Signed and Sealed this

Fourth Day of January, 2005

JON W. DUDAS
*Director of the United States Patent and Trademark Office*